(12) United States Patent
Di Girolamo et al.

(10) Patent No.: US 11,259,232 B2
(45) Date of Patent: Feb. 22, 2022

(54) METHODS FOR ENABLING EN-ROUTE RESOURCE DISCOVERY AT A SERVICE LAYER

(71) Applicant: Convida Wireless, LLC, Wilmington, DE (US)

(72) Inventors: Rocco Di Girolamo, Laval (CA); Hongkun Li, Malvern, PA (US); Lijun Dong, San Diego, CA (US); Guang Lu, Thornhill (CA); Qing Li, Princeton Junction, NJ (US); Catalina M. Mladin, Hatboro, PA (US); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 156 days.

(21) Appl. No.: 15/751,598

(22) PCT Filed: Aug. 15, 2016

(86) PCT No.: PCT/US2016/046975
§ 371 (c)(1),
(2) Date: Feb. 9, 2018

(87) PCT Pub. No.: WO2017/027869
PCT Pub. Date: Feb. 16, 2017

(65) Prior Publication Data
US 2018/0234908 A1   Aug. 16, 2018

Related U.S. Application Data

(60) Provisional application No. 62/204,546, filed on Aug. 13, 2015.

(51) Int. Cl.
*H04W 40/24* (2009.01)
*H04W 4/70* (2018.01)
(Continued)

(52) U.S. Cl.
CPC ....... *H04W 40/246* (2013.01); *H04L 41/5058* (2013.01); *H04L 67/16* (2013.01); *H04W 4/70* (2018.02); *H04L 41/12* (2013.01)

(58) Field of Classification Search
None
See application file for complete search history.

(56) References Cited

U.S. PATENT DOCUMENTS

| 2002/0184357 | A1* | 12/2002 | Traversal | G06F 9/4416 709/223 |
| 2014/0089478 | A1* | 3/2014 | Seed | H04W 4/50 709/222 |

(Continued)

FOREIGN PATENT DOCUMENTS

| WO | WO 2013/142139 A2 * | 9/2013 |
| WO | 2014/139114 A1 | 9/2014 |
| WO | 2014/186733 A1 | 11/2014 |

OTHER PUBLICATIONS

OneM2M Technical Specification TS-0001 V1.6.1, "Functional Architecture", Jan. 30, 2015, 321 pages.
(Continued)

*Primary Examiner* — Saumit Shah
(74) *Attorney, Agent, or Firm* — BakerHostetler

(57) ABSTRACT

The present application is at least directed to a networked apparatus. The apparatus includes a non-transitory memory having instructions stored thereon for processing a discovery request message for a resource on the network. The apparatus also includes a processor, operably coupled to the non-transitory memory, configured to perform a set of instructions. One instruction includes receiving the discovery request message from an originator including filter criteria. Another instruction includes checking whether any resources match the filter criteria in the discovery request message. A further instruction includes preparing a discov-
(Continued)

ery response. The present application is also directed to a method for processing a discovery request message for a resource on the network. The present application is further directed an apparatus and method for performing discovery of a common service entity.

10 Claims, 19 Drawing Sheets

(51) Int. Cl.
  *H04L 67/51* (2022.01)
  *H04L 41/50* (2022.01)
  *H04L 41/12* (2022.01)

(56) References Cited

U.S. PATENT DOCUMENTS

| | | | | |
|---|---|---|---|---|
| 2015/0382174 A1* | 12/2015 | Guo | ............ | H04W 8/005 |
| | | | | 370/311 |
| 2016/0212732 A1* | 7/2016 | Choi | ............ | H04W 4/70 |
| 2016/0234691 A1* | 8/2016 | Jeong | ............ | H04W 4/70 |

OTHER PUBLICATIONS

OneM2M Technical Specification TS-0001-V2.3.0, "Functional Architecture" Aug. 7, 2015, 352 pages.
OneM2M Technical Specification TS-0007 V0.3.0, "Service Component Architecture" Jun. 17, 2014, 105 pages.
OneM2M White Paper, "The Interoperability Enabler for the Entire M2M and IoT Ecosystem" Jan. 2015, 14 pages.

* cited by examiner

METHODS FOR ENABLING EN-ROUTE RESOURCE DISCOVERY AT A SERVICE LAYER

CROSS-REFERENCE TO RELATED APPLICATIONS

This Application is a National Stage Application filed under 35 U.S.C. § 371 of International Application No. PCT/US2016/046975 filed Aug. 15, 2016, which claims priority to U.S. Provisional Application No. 62/204,546 filed on Aug. 13, 2015, the disclosures of which are incorporated herein in their entireties.

FIELD

The present application is directed to resource discovery architecture and protocols. More particularly, the application describes en-route resource discovery protocols at the service layer.

BACKGROUND

Presently, oneM2M discovery requests are sent from an originator—Application Entity (AE) or Common Service Entity (CSE)—to a hosting CSE. Transit CSEs located between the originator and hosting CSE are capable only to forward discovery requests. While this ensures the privacy of the discovery it does not allow transit CSEs to participate in the discovery process.

Current discovery mechanisms also lack support for deployments/systems where the transit CSEs can process the discovery request. In turn, the originator cannot ask to find any matching instances of a resource or to find all matching resources in transit CSEs.

Moreover, the originator cannot make a conditional discovery request based on two or more resources. Even further, the originator cannot find the optimal matching resource, e.g., there may be another Hosting CSE with a matching resource, wherein the matching resource may be in a CSE that is closer to the Originator in terms of number of service level hops, or that has more processing power to handle the discovery request.

These drawbacks present the following issues in the field. First, there is unnecessary service layer signaling from the originator to the host CSE. Second, there is unnecessary latency in discovering resources that match the filter criteria. Moreover, there is a lack of flexibility in resource discovery. That is, discovery resources, including both the original and announced resources, are only at an originator or the hosting CSE.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and system for facilitating en-route resource discovery at a service layer.

In one aspect of the application, there is described a networked apparatus. The apparatus includes a non-transitory memory having instructions stored thereon for performing discovery of a resource. The apparatus also includes a processor, operably coupled to the non-transitory memory. The processor is configured to perform at least the instruction generating a discovery request message. The processor is also configured to perform the instruction of sending the discovery request message to a common service entity. Further, the processor is configured to perform the instruction of receiving a discovery response from the common service entity.

In another aspect of the application, there is described a computer-implemented method for performing discovery at a common service entity. The method includes a step of generating a discovery request message (DRM) including a discovery type. The method also includes a step of sending the DRM to a CSE. The method further includes a step of receiving a discovery response from the CSE.

Yet another aspect of the application is directed to a networked apparatus. The apparatus includes a non-transitory memory having instructions stored thereon for processing a discovery request for a resource. The apparatus also includes a processor, operably coupled to the non-transitory memory. The processor is configured to perform the instructions of (i) receiving a discovery request message from an originator including filter criteria; (ii) checking whether any resources match the filter criteria in the message; and (iii) preparing a discovery response message.

Yet even another aspect of the application is directed to a computer-implemented method for performing discovery at a common service entity. The method includes a step of receiving a discovery request message from an originator including a discovery type and filter criteria. The method also includes a step of checking whether a resource matches the filter criteria in the message. The method further includes a step of preparing a discovery response message.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1:
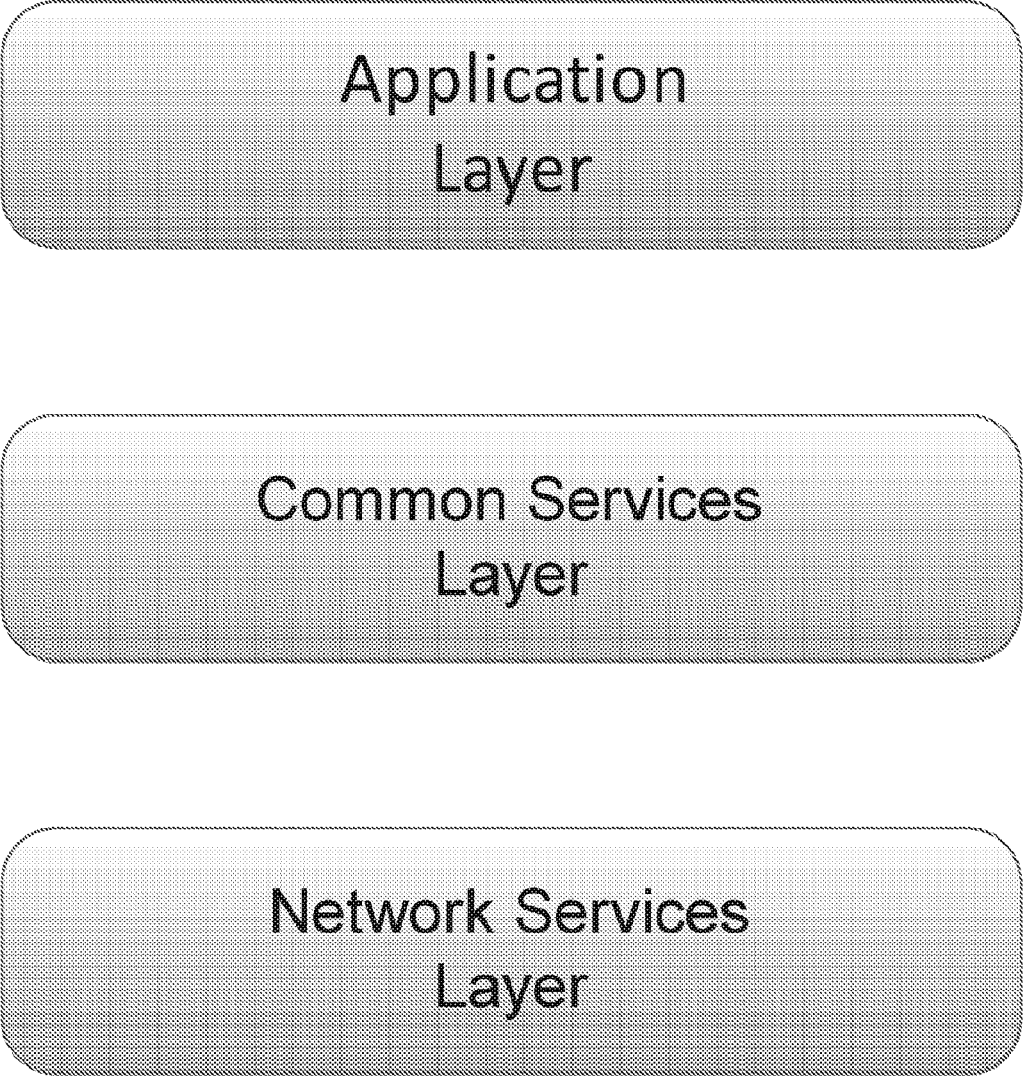
FIG. 1 illustrates the relationship between an application layer, common services layer and network services layer.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Generally, oneM2M provides a simple resource discovery mechanism that allows an Originator to find resources that match specified filter criteria at a hosting CSE. The originator is made aware of the hosting CSE either through pre-provisioning or through a prior discovery operation. The filter criteria allows the originator to tailor the response received—by type, by creation time, by update time, by size, by label, etc. The hosting CSE responds with a list of addresses of the matching resources. This may be up to some originator-specified maximum number. As the discovery request makes its way to the hosting CSE, it typically traverses a number of transit CSEs. According to this application, the Transit CSEs are configured with protocols to assist in the discovery process and enables enhanced resource discovery mechanisms.

In one embodiment, the originator may issue a discovery request (through a new API) to allow selection of one of the enhanced resource discovery mechanisms, and to specify the parameters related to these mechanisms. The originator can request transit CSEs to perform a multi-hop discovery, a conditional discovery, or a Hosting CSE redirection. With multi-hop discovery, the originator can ask the transit CSEs to perform a service layer route discovery to the hosting CSE, or find the first 'K' matching resources. Separately in another embodiment, with conditional discovery, the originator can ask a specific CSE to only forward a discovery request if a predetermined condition is met. In another embodiment, with Hosting CSE redirection, the Originator can ask the transit CSEs to suggest better hosting CSEs.

Separately, the originator may receive a discovery response, signaling the status of conditional discovery, the hosting CSE redirection, and/or the multi-hop discovery. For multi-hop discovery the response may signal the transit CSEs between the originator and the hosting CSE as well as status of these CSEs for a route discovery. For example, in a conditional discovery, the response may signal to the originator that the condition at a transit CSE has failed. In another example, for hosting CSE redirection, the response may signal to the originator a list of hosting CSEs that have a matching resource.

Generally, in the embodiments discussed in more detail below, during multi-hop discovery, a transit CSE processes the discovery request and prepares a pending discovery response. This discovery response is not immediately sent. In addition, they forward the discovery request if more matching resources are needed, and wait for a discovery response. Upon reception of a discovery response, they extract the list of matching resources and append this list to the pending discovery response before sending. In conditional discovery, a transit CSE verifies if it needs to check a condition. It only forwards the request if the condition is met. During a hosting CSE redirect, a transit CSE determines if other hosting CSEs have matching resources. If it does, the CSE provides this information to the originator along with a set of metrics.

Definitions and Acronyms

Provided below are definitions for terms and phrases commonly used in this application in Table 1. Table 2 further provides acronyms for terms and phrases used in this application.

TABLE 1

| Term/Phrase | Definition |
| --- | --- |
| Announced Resource | An original resource may be announced (published) to a remote CSE. The resource at the remote CSE is known as an announced resource. The announced resource is linked to the original resource and maintains some of the attributes of the original resource. |
| Common Services Entity | oneM2M term for an instantiation of a set Common Service Functions. |
| Common Services Function | oneM2M term for a Service Capability. Capabilities/Functionalities that reside in the common Service Layer. |
| Conditional CSE | A CSE which evaluates a condition and only forwards discovery requests if this condition passes. |

TABLE 1-continued

| Term/Phrase | Definition |
| --- | --- |
| Hosting CSE | A CSE which hosts various resources (oneM2M name for a Hosting Node) |
| Hosting Node | An M2M Service node which hosts various resources. The hosted resources can be accessed and subscribed by other M2M entities. |
| M2M Service Node | A network node hosting a service layer supporting one or more service capabilities for M2M communication. |
| Middle Node CSE | The CSE in a middle node. |
| Middle Node | A node between the Originator and the Hosting CSE |
| Original Resource | A created resource hosted in a CSE. An original resource may be announced to a remote CSE |
| Service Capability | A specific type of service supported by a service layer |
| Service Layer | A software middleware layer that sits between M2M applications and communication HW/SW that provides data transport. It provides commonly needed functions for M2M applications across different industry segments |
| Receiver CSE | The CSE that is that target of a Request operation. For example the CSE where an Originator is trying to perform a resource discovery. |
| Registree CSE | A CSE that registers to a second CSE to receive the services offered by the second CSE. |
| Registrar CSE | A CSE that accepts registration requests from a Registree CSE, and offers services to the Registree CSE. |
| Remote CSE | A CSE that is not a Hosting CSE of a resource. |
| Transit CSE | A CSE which is not the destination of a service layer message, but rather an intermediary CSE for forwarding or relaying the service layer message towards the Receiver CSE. |
| Transit Node | An M2M service node which is not the destination of a service layer message, but rather an intermediary node for forwarding or relaying the service layer message towards the destination. |

TABLE 2

| Acronym | Term/Phrase |
| --- | --- |
| ADN | Application Dedicated Node |
| AE | Application Entity |
| App | Application |
| ASM | Application and Service Layer Management |
| ASN | Application Service Node |
| CMDH | Communication Management and Delivery Handling |
| CSE | Common Service Entity |
| CSF | Common Service Function |
| DIS | Discovery |
| DMR | Data Management and Repository |
| eDis | Enhanced Discovery |
| IN | Infrastructure Node |
| IoT | Internet of Things |
| IP | Internet Protocol |
| LOC | Location |
| M2M | Machine-to-Machine |
| MN | Middle Node |
| NSE | Underlying Network Services Entity |
| NSSE | Network Service Exposure, Service Execution and Triggering |
| REG | Registration |
| ROA | Resource Oriented Architecture |
| SC | Service Capability |
| LOC | Location |
| SCA | Service Charging and Accounting |
| SEC | Security |
| SOA | Service Oriented Architecture |
| SUB | Subscription and Notification |
| UDP | User Datagram Protocol |
| URI | Uniform Resource Identifier |

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

oneM2M Common Service Layer and Common Service Functions oneM2M has developed a set of standards which define a single horizontal platform for the exchange and the sharing of data among all applications. This even includes applications across different industry sectors. OneM2M is creating a distributed software layer—like an operating system— which is facilitating that unification by providing a framework for interworking with different technologies. This distributed software layer is implemented in a common service layer that sits between the M2M applications and the communication HW/SW that provides data transport. This is illustrated, for example, in FIG. 1.

The Common Services Layer provides a set of services which are grouped together, by functionality, into Common Services Functions (CSFs). A number of instantiated CSFs makeup a Common Services Entities (CSEs). The CSEs interface with: applications (Application Entities or AEs in oneM2M nomenclature); other CSEs; and the underlying networks (Network Service Entity or NSE in oneM2M nomenclature).

Figure 2:
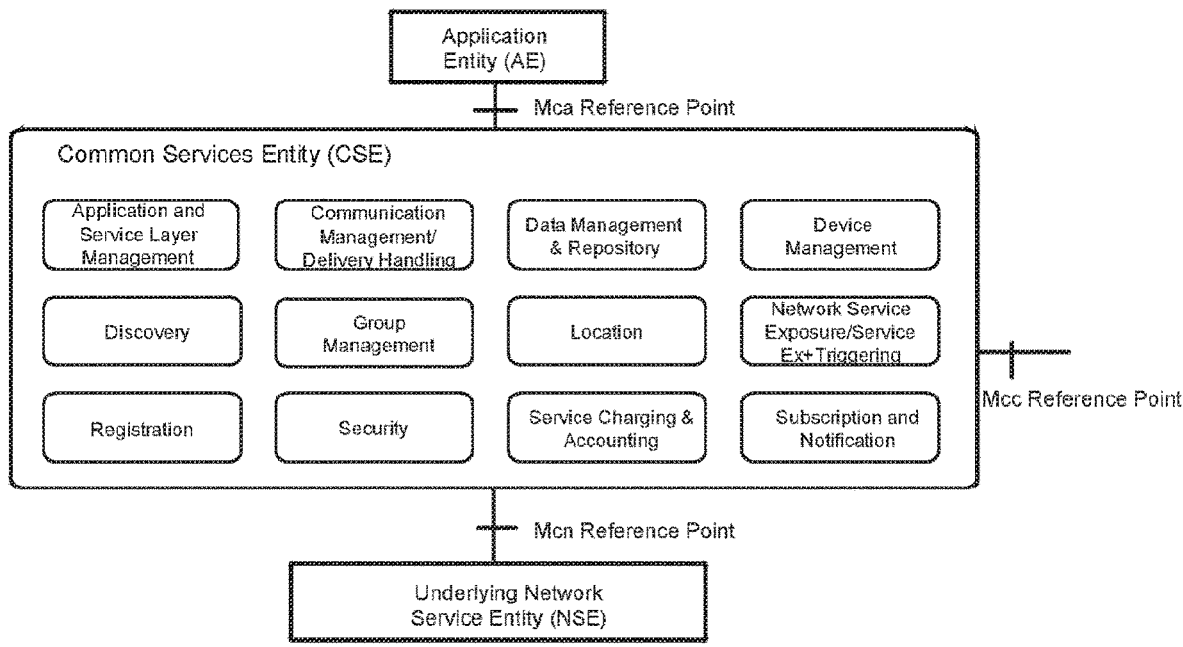
FIG. 2 illustrates the relationship between an application entity, common service entity (CSE) and the underlying network.

As shown in FIG. 2, the communication flowing across these interfaces are through the Mca, Mcc (and Mcc'), and Mcn reference points. Also shown in FIG. 2 are the twelve CSFs that are currently defined by oneM2M. Each of the CSFs are briefly described below.

Application and Service Layer Management CSF: provides management of AEs and CSEs. This includes capabilities to configure, troubleshoot and upgrade functions of the CSE, as well as to upgrade the AEs.

Discovery CSF: searches for information about applications and services based on filter criteria.

Registration CSF: Provides the functionality for AEs (or other remote CSEs) to register with a CSE. This allows the AEs (or the remote CSE) to use the services of the CSE.

Communication Management/Delivery Handling CSF: provides communications with other CSEs, AEs and NSEs. This CSF decides at what time and which communication connection for delivering communications and if necessary and allowed, to buffer communications request so that they can be forwarded at a later time.

Group Management CSF: provides for the handling of group related requests. Enables an M2M system to support bulk operations on multiple devices, applications, etc.

Security CSF: provides security functions for the service layer, such as access control including identification, authentication, and authorization.

Data Management and Repository CSF: provides data storage and mediation functions (collecting data for aggregation, re-formatting data, and storing data for analytics and semantic processing).

Location CSF: provides the functionality to enable AEs to obtain geographical location information.

Service Charging & Accounting CSF: provides charging functions for the service layer Device Management CSF: provides management of device capabilities on M2M gateways and M2M devices.

Network Service Exposure, Service Execution and Triggering CSF: manages communications with the Underlying Networks for accessing network service functions Subscription and Notification CSF: provides functionality to allow for subscribing to an event and to be notified when this event occurs.

Figure 3:
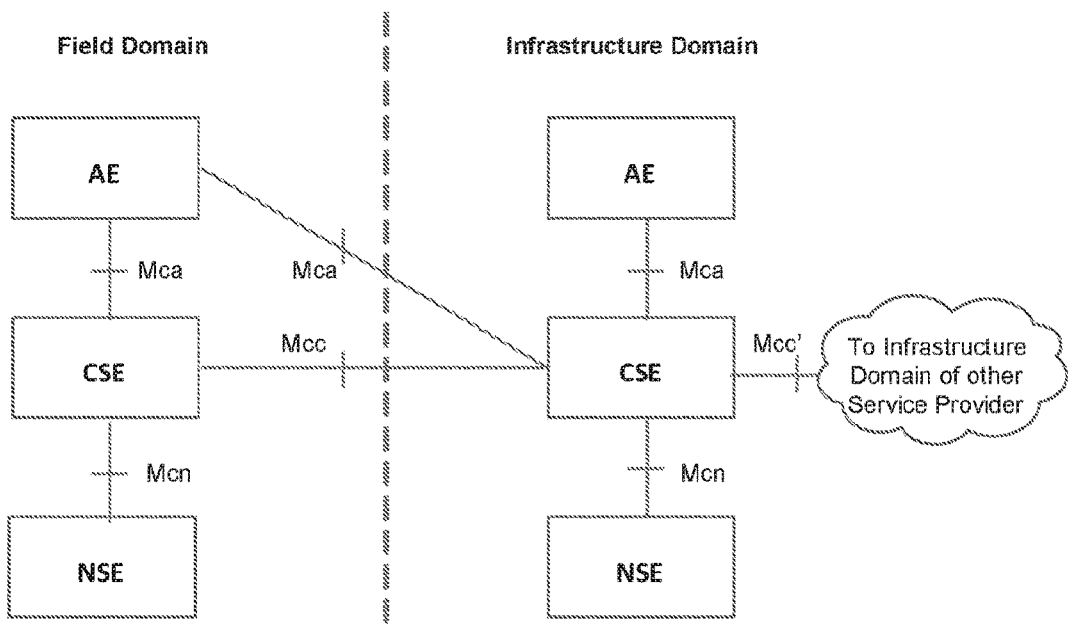
FIG. 3 illustrates the relationship between the field domain and the infrastructure domain.

Functional Architecture oneM2M is developing the service layer architecture, called Resource Oriented Architecture (ROA) as shown in FIG. 3.

In the ROA the architecture is developed around resources. The CSFs operate on these resources to perform their service. A resource is a uniquely addressable element in the architecture having a representation that can be manipulated via RESTful methods such as CREATE, RETRIEVE, UPDATE, and DELETE. These resources are made addressable using a Uniform Resource Identifiers (URIs). A resource may contain child resource(s) and attribute(s). A child resource is a resource that has a containment relationship with a parent resource. As a result, resources can be viewed as a hierarchical tree, stemming from a base resource. The parent resource representation contains references to its child resources(s). The lifetime of a child-resource is limited by the parent's resource lifetime. Each resource supports a set of "attributes" that store information of the resource. A set of attributes are common to all resources, while others apply only to specific resources. The latter are referred to as "resource specific attributes". Certain resources located at one CSE (referred to as Hosting CSE) can be announced to remote CSEs, and these are referred to announced resources. The announced resources may contain attributes of the original resource as well as their own attributes. Synchronization between the original resource and the announced resource is the responsibility of the Hosting CSE.

Resource Discovery CSF

Resource discovery is the process by which an entity, such as for example, the originator, searches for information about applications and services contained in attributes and resources. The originator of a resource discovery can be an AE or a CSE, and is always targeting a root resource at a receiver CSE (root resource is the resource where the search is to start). The search result depends on the filter criteria & discovery result type specified by the originator, and is subject to the access control policy at the receiver CSE. That is, whether the originator has "DISCOVER" access rights. The originator can use the filter criteria to limit the number of returned results, and to only return results matching certain search parameters, e.g., based on resource type, resource creation time, resource size, etc. The complete list of search parameters is provided in Table 3 below. These parameters may be combined by relational operations to create compound search criteria. For example, when multiple conditions are used together, different conditions shall use the "AND" logical operation while same conditions shall use the "OR" logical operation.

TABLE 3

| Search Parameter | Resource is matching if: |
|---|---|
| createdBefore | It was created before createdBefore |
| createdAfter | It was created after createdAfter |
| modifiedSince | It has been modified since modifiedSince |
| unmodifiedSince | It has not been modified since unmodifiedSince |
| stateTagSmaller | It has stateTag attribute smaller than stateTagSmaller |
| stateTagBigger | It has stateTag attribute larger than stateTagBigger |
| expireBefore | It has expirationTime attribute before expireBefore |
| expireAfter | It has expirationTime attribute after expireAfter |
| labels | It has labels attribute matching labels search parameter. The labels are tokens used as keys for discovery purposes |
| resourceType | It is of type resourceType |
| sizeAbove | The contentSize attribute of the <contentInstance> resource is equal to or greater than the sizeAbove value |
| sizeBelow | The contentSize attribute of the <contentInstance> resource is smaller than the sizeBelow value |
| contentType | The contentInfo attribute of the <contentInstance> resource matches the contentType value |
| attribute | It has a matching attribute. These refer mostly to resource specific attributes. |

Figure 4:
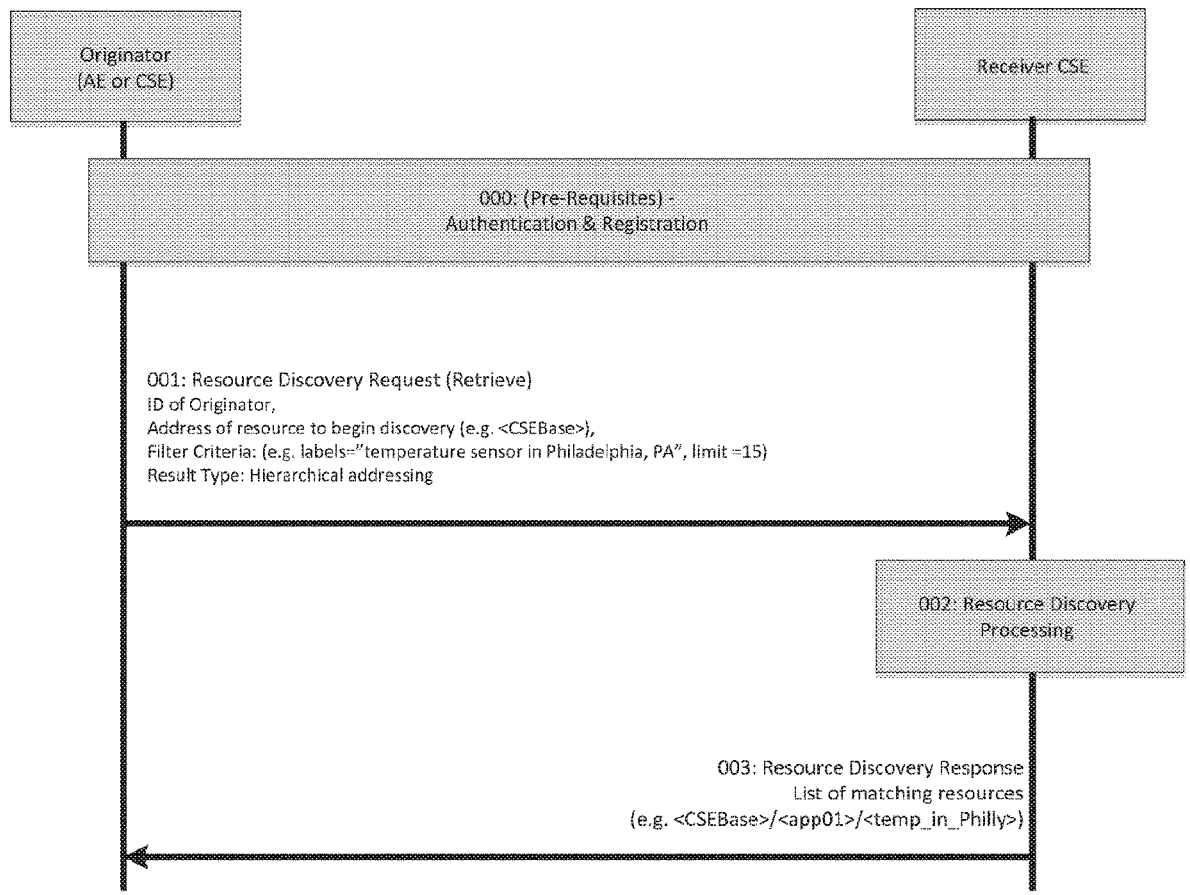
FIG. 4 illustrates a general resource discovery procedure according to an embodiment.

The originator can use the discovery result type to indicate to the receiver CSE the format of the returned result. Two options are available. The first is Hierarchical addressing and the second is Non-hierarchical addressing. The resource discovery is implemented using a RETRIEVE method. To allow the receiver CSE to distinguish between a resource discovery operation and a generic retrieve operation, the originator signals this to the receive CSE using a dedicated flag. The general resource discovery procedure is shown in FIG. 4. Each of steps is denoted by a number. First, the originator issues the resource discovery request (Step 001) to the receiver CSE, targeting specific child resources of resource <CSEBase>/<app01>. The receiver CSE processes the request and returns the appropriate list of discovered resources (Step 002). The receiver CSE may limit the discovery result according to the DISCOVER privileges of the discovered resources, and may change the filter criteria according to its own local policy. If the full list of discovered resources cannot be returned, the receiver CSE will warn the originator. The warning may for example be with a flag. The resource discovery response (Step 003) includes a list of addresses of the resources that match the filter criteria. It is the responsibility of the Originator, if needed, to retrieve the resources pointed to by the addresses.

Service Discovery

The DNS-Service Discovery (DNS-SD) is a relatively new feature that has been added to DNS in recent years. DNS-SD refers to the use of DNS to discover available local network IP based services in addition to the usual name resolution function provided by DNS. For example, querying DNS-SD for available printers in the local network that can be accessed via IP. Specifically, given a type of service, e.g., printing, that a client is looking for, this mechanism allows clients to discover a local list of devices (named instances) of that desired service, in a given domain, using standard DNS-queries. The commercial precursor to the IETF standardized solution was by Apple Computer and was referred to as "AppleTalk" (sometimes also referred to as "Bonjour").

General Architecture

Figure 5A:
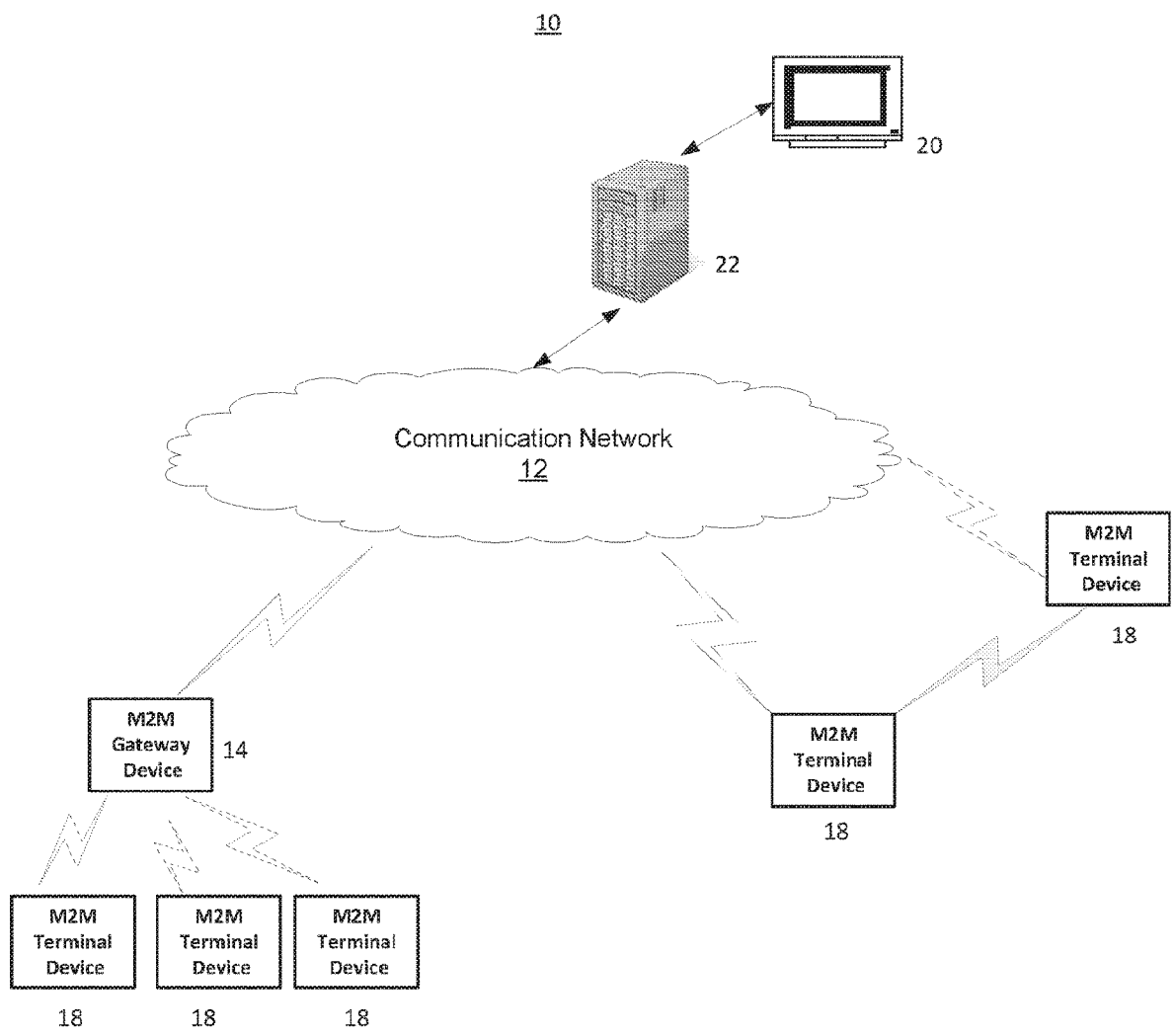
FIG. 5A illustrates an embodiment of a machine-to-machine (M2M) or IoT communication system.

FIG. 5A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 5A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a satellite network, a home network, or an enterprise network for example.

As shown in FIG. 5A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a Service Capability Server (SCS) with a proxy, and terminal devices 18, such as UE devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN, e.g., Zigbee, 6LoWPAN, Bluetooth, direct radio link, and wireline for example.

Figure 5B:
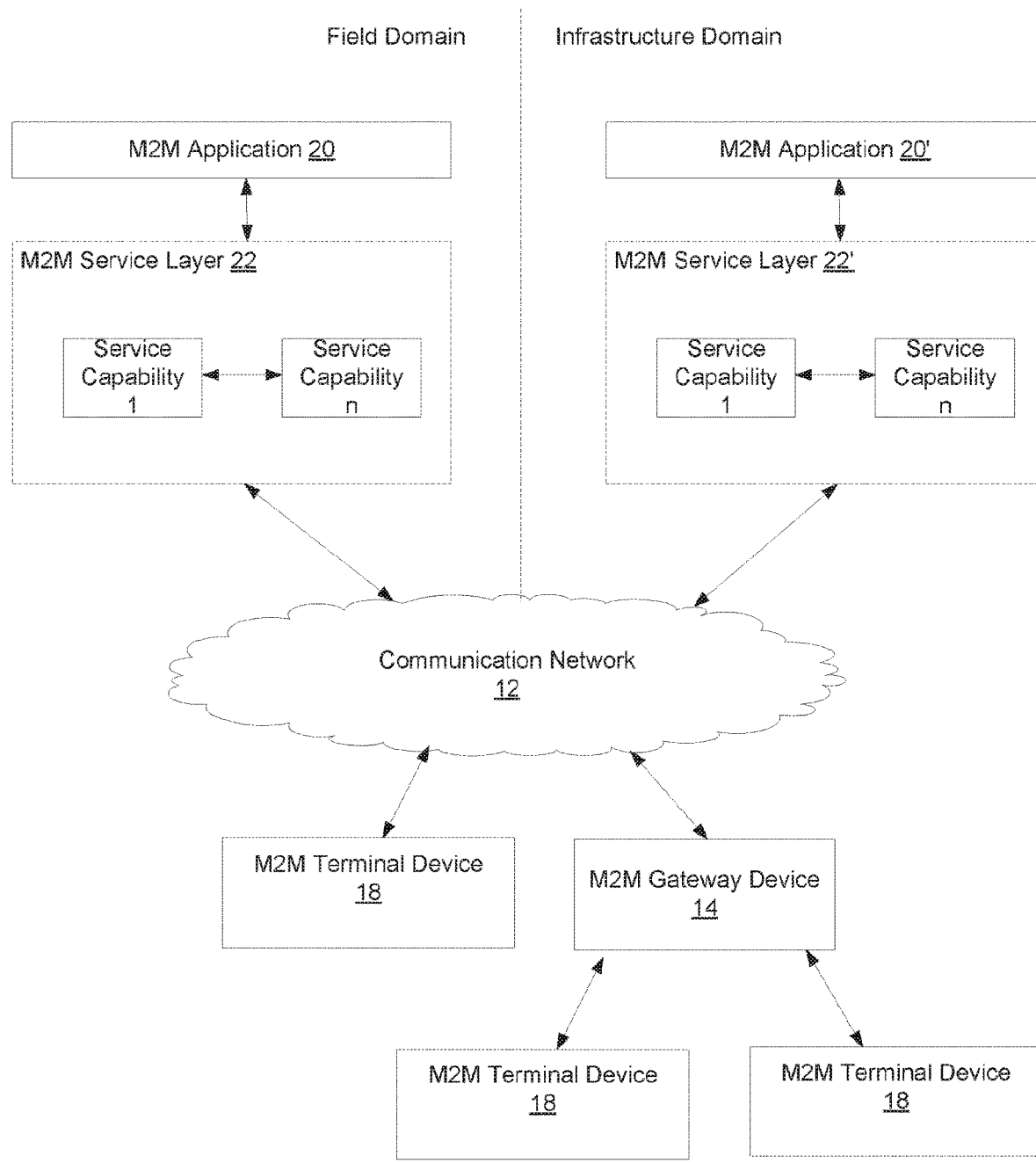
FIG. 5B illustrates an embodiment of the application of a M2M service platform.

Referring to FIG. 5B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, such as for example transit CSEs, M2M terminal devices 18, such as host CSEs and Originators, as well as communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 5B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location Tracking/geo-fencing, device/service discovery, and legacy systems integration, and provides these functions as services to the M2M applications 20 and 20'. Moreover, the M2M service layer may also be configured to interface with other devices such as UEs, SCSs and MMES as discussed in this application and illustrated in the figures.

Figure 5C:
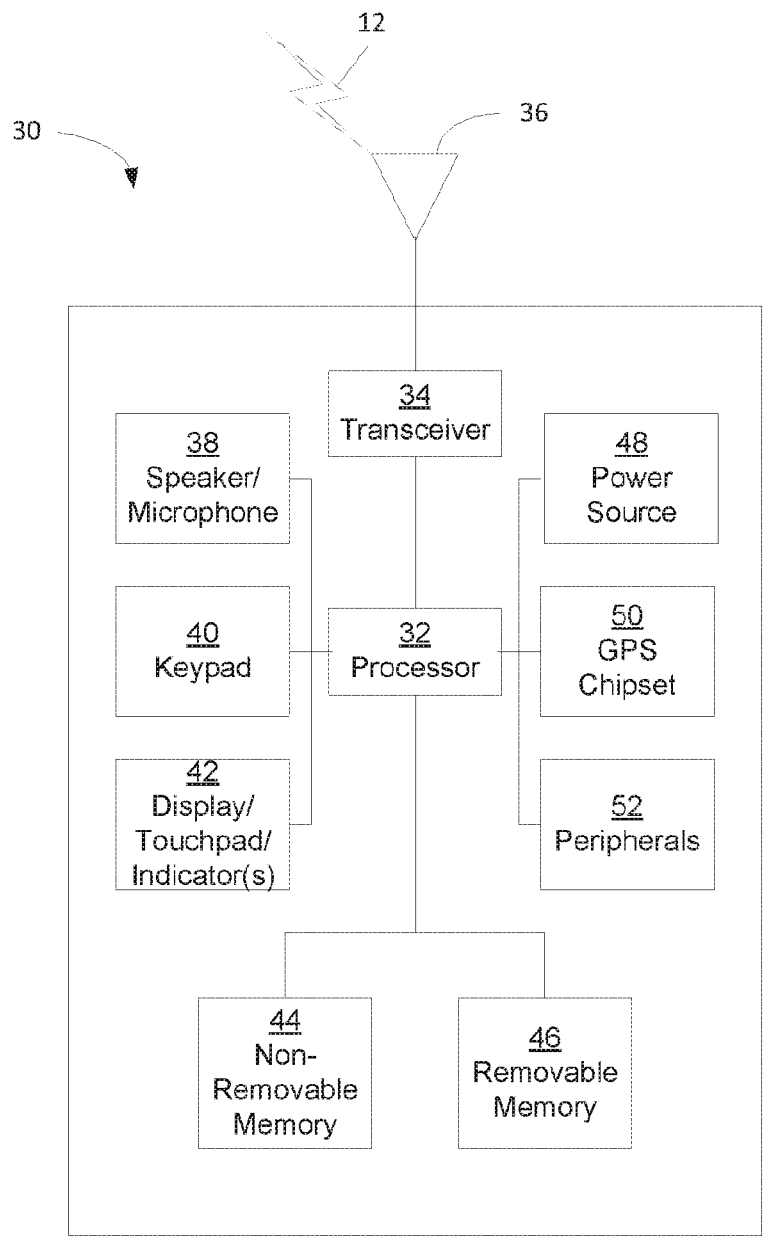
FIG. 5C illustrates an embodiment of the application of a system diagram of an example M2M device.

The service layer is a software middleware layer that supports value-added service capabilities through a set of Application Programming Interfaces (APIs) and underlying networking interfaces. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE), such as a SCS which may be hosted on different types of network nodes, e.g., infrastructure node, middle node, application-specific node FIG. 5C is a system diagram of an example M2M device 30, such as a M2M terminal device 18 or an M2M gateway device 14 for example. As shown in FIG. 5C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. The M2M device 30 may also be employed with other devices, including for example originators and hosting/transit CSEs as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 5C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 5C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 5D:
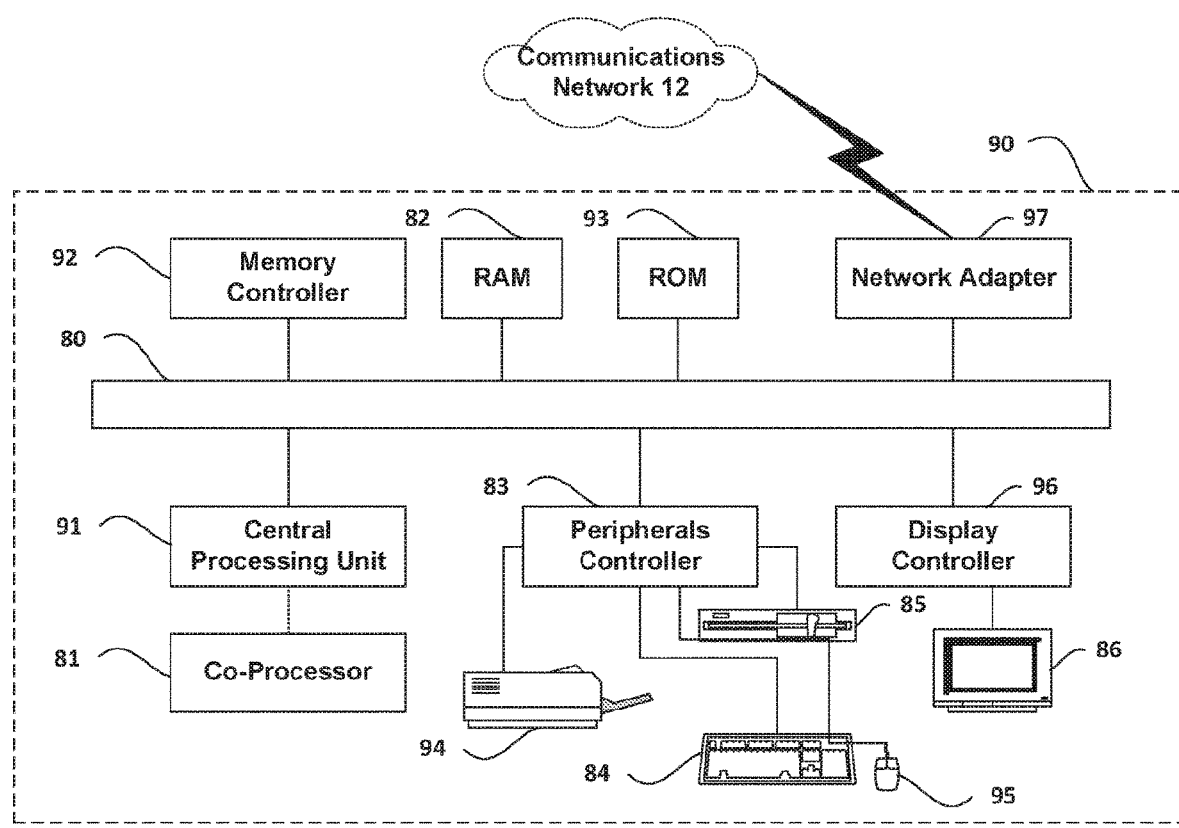
FIG. 5D illustrates an embodiment of the application of a block diagram of an exemplary computing system.

FIG. 5D is a block diagram of an exemplary computing system 90 on which, for example, the M2M service platform 22 of FIG. 5A and FIG. 5B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. This may include, for example, discovery results for multi-hop discovery, conditional discovery and hosting CSE redirect. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 5A and FIG. 5B.

En-Route Resource Discovery

According to an aspect of the application, the proposed enhanced discovery CSF and the en-route processing provide added benefits to the service layer. This includes, for example, multi-hop discovery, whereby transit CSEs determine if they have any resources matching the filter criteria. This also includes conditional discovery whereby transit CSEs determine if a condition is met before forwarding a discovery request. This may further include a hosting CSE redirect where the transit CSEs are aware of alternate hosting CSEs that have resources that match the filter criteria and can redirect discovery requests to one of these alternate hosting CSEs.

Figure 6:
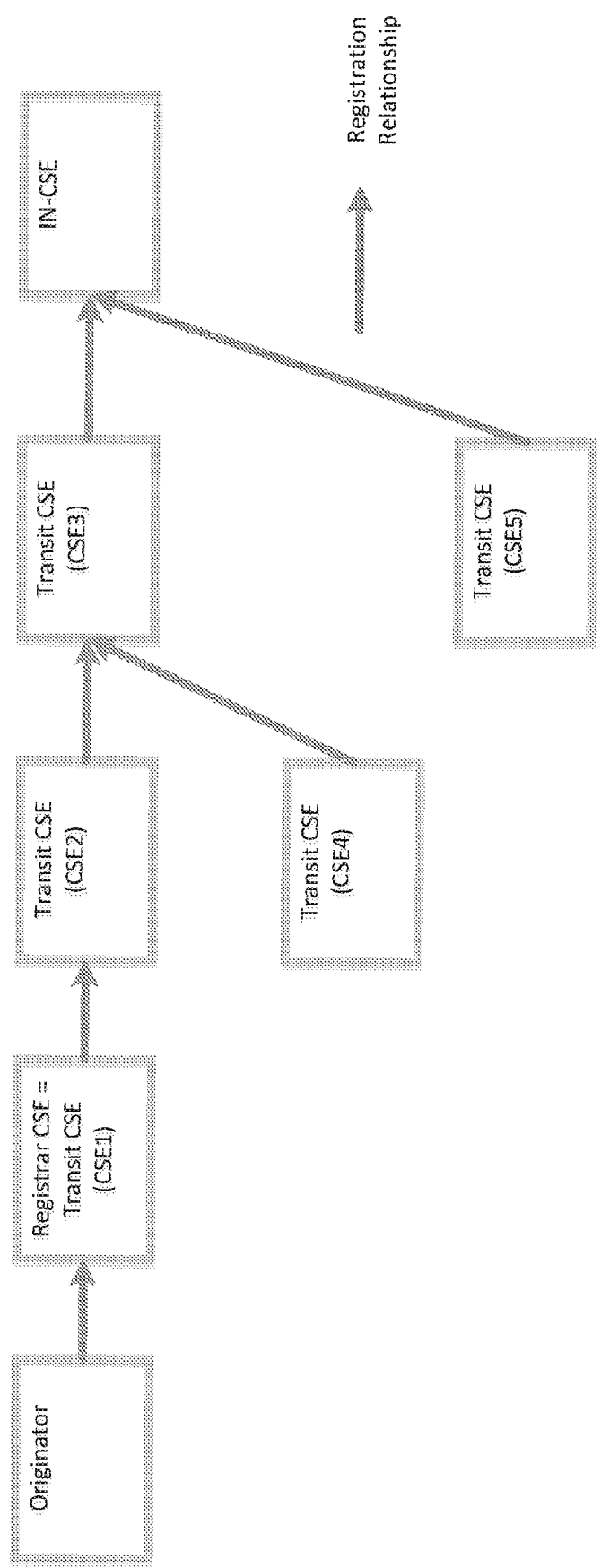
FIG. 6 illustrates an embodiment showing the relationship between an originator, plural transit CSEs and a host CSE.

In one embodiment as illustrated in FIG. 6, a typical service layer deployment will be assumed. In FIG. 6, the Originator (an AE or CSE) 610 and Hosting CSE 630 are separated by a number of Transit CSEs 620. In one aspect, one or more of the transit CSEs can have multiple registree CSEs.

Processing typically begins at the originator. A single parameter is generally included to indicate which enhanced discovery procedure, if any, is to be followed at each of the entities. This new parameter Discovery Type is included in the discovery request message generated by the Originator. The Discovery Type may include one or more of the following types of values: (i) forwarding (no enhanced discovery procedure); (ii) multi-hop discovery; (iii) conditional discovery; and (iv) hosting CSE redirect. Alternatively, the originator may omit the Discovery Type parameter in the discovery request, and rely on implicit behavior at the CSEs which may treat the absence of the Discovery Type parameter as an indication to not use an enhanced discovery procedure (i.e. use forwarding).

At the CSEs, a new discoveryType attribute may be employed. Here, each CSE may optionally support one or more of the enhanced discovery procedures. This information may be included in an attribute of the <CSEBase> resource, such as for example, discoveryType. The attribute can list the supported discovery procedures. For example, for forwarding (no enhanced discovery procedure), the CSE forward the discovery request towards the hosting CSE if it is a transit CSE. The other options for this attribute may include, for example, multi-hop discovery, conditional discovery, and hosting CSE redirect.

In addition, the discoveryType attribute may also indicate if a CSE is capable of performing multiple enhanced discovery mechanisms simultaneously. For example, the discoveryType may be multi-hop discovery and conditional discovery. The discoveryType attribute allows an entity to discover the supported enhanced discovery procedure supported by a CSE.

According to another aspect, access control at each CSE may be based on the existing access control rules for the DISCOVER operation. That is, an originator with DISCOVER privileges on a resource has automatic privileges for the enhanced discovery procedures. Alternatively to provide more flexibility, specific discover privileges may be maintained for each enhanced discovery type. This would allow individual rules to apply to multi-hop discovery, conditional discovery, and hosting CSE redirect. For example, three additional accessControlOperations may be defined: (i) DISCOVER_MULTIHOP is a privilege to discover the resource and forward request; (ii) DISCOVER_CONDITIONAL is a privilege to conditionally discover the resource; and (iii) DISCOVER_REDIRECT is a privilege to redirect hosting CSE.

Figure 7:
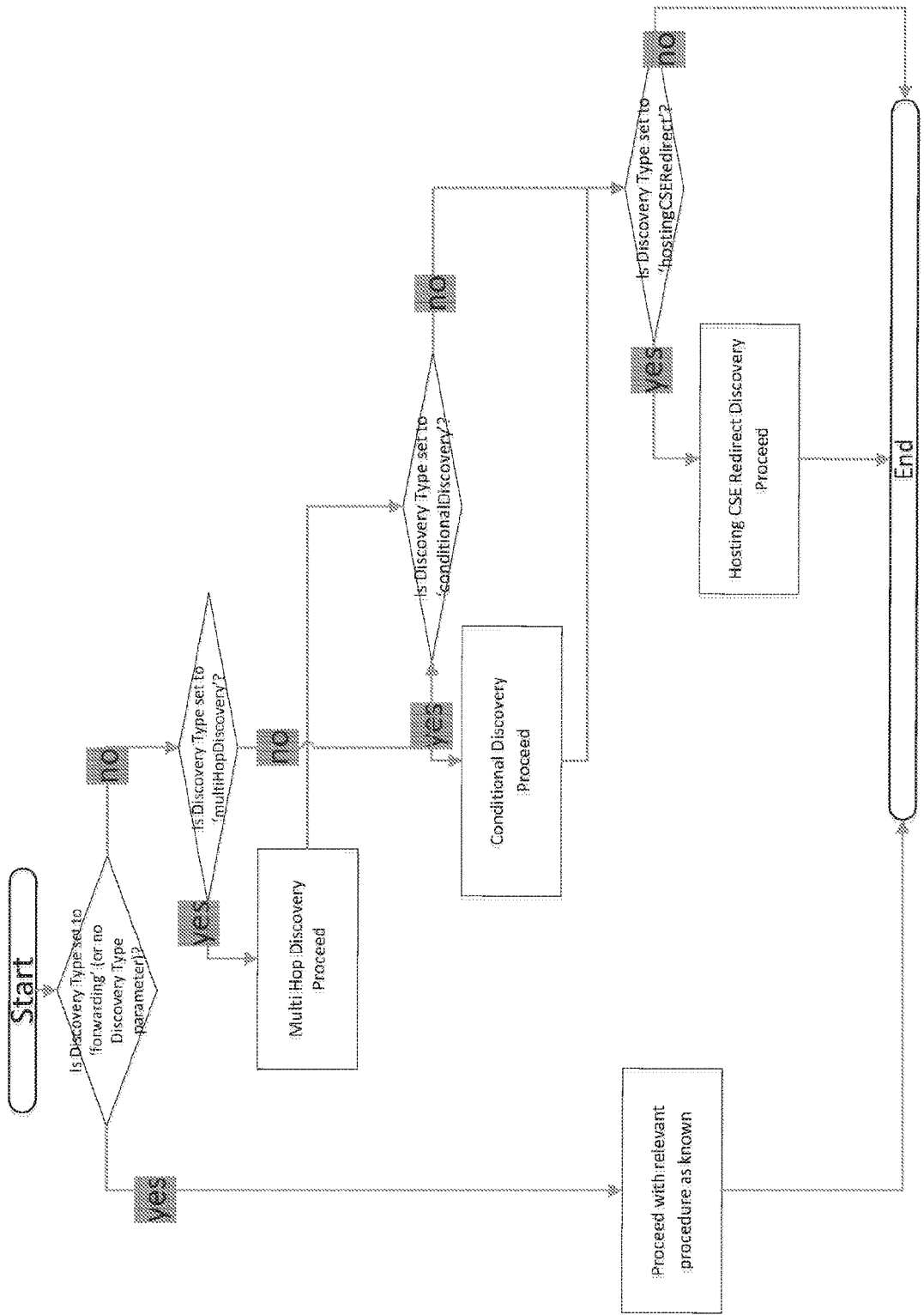
FIG. 7 illustrates a discovery procedure according to an embodiment.

Next, the overall processing, as illustrated in FIG. 7, between the originator, transit CSE, and hosting CSE will be discussed. Generally, it is the responsibility of the originator to specify the desired discoveryType. For instance if the originator is interested in a specific resource at a specific hosting CSE, it would likely issue a discovery request with no enhanced procedure. Alternatively, if enhanced procedures are desired, a number of options are available to the originator. The originator may specify CSE types that are requested to perform the enhanced discovery. For instance the Originator may request that enhanced discovery only occur in: (i) MN-CSEs (not ASN-CSEs); (ii) CSEs of a certain class or tier (we assume that the CSEs have an assigned tier or class type); (iii) CSEs that have significant processing (high memory, low activity, etc); or (iv) CSE within a supplied list. According to further embodiment, a CSE will only perform an enhanced discovery procedure if: (i) it is requested by an originator; (ii) it supports the requested enhanced discovery procedure; and (iii) the Originator has access rights to perform the enhanced procedure.

During multi-hop discovery, the originator can issue a discovery request that solicits each transit CSE (at every hop towards the hosting CSE) to check if it possesses any resource that matches the discovery filter criteria, and to return the results to the Originator. The processing at each of the impacted entities is described below.

Figure 8:
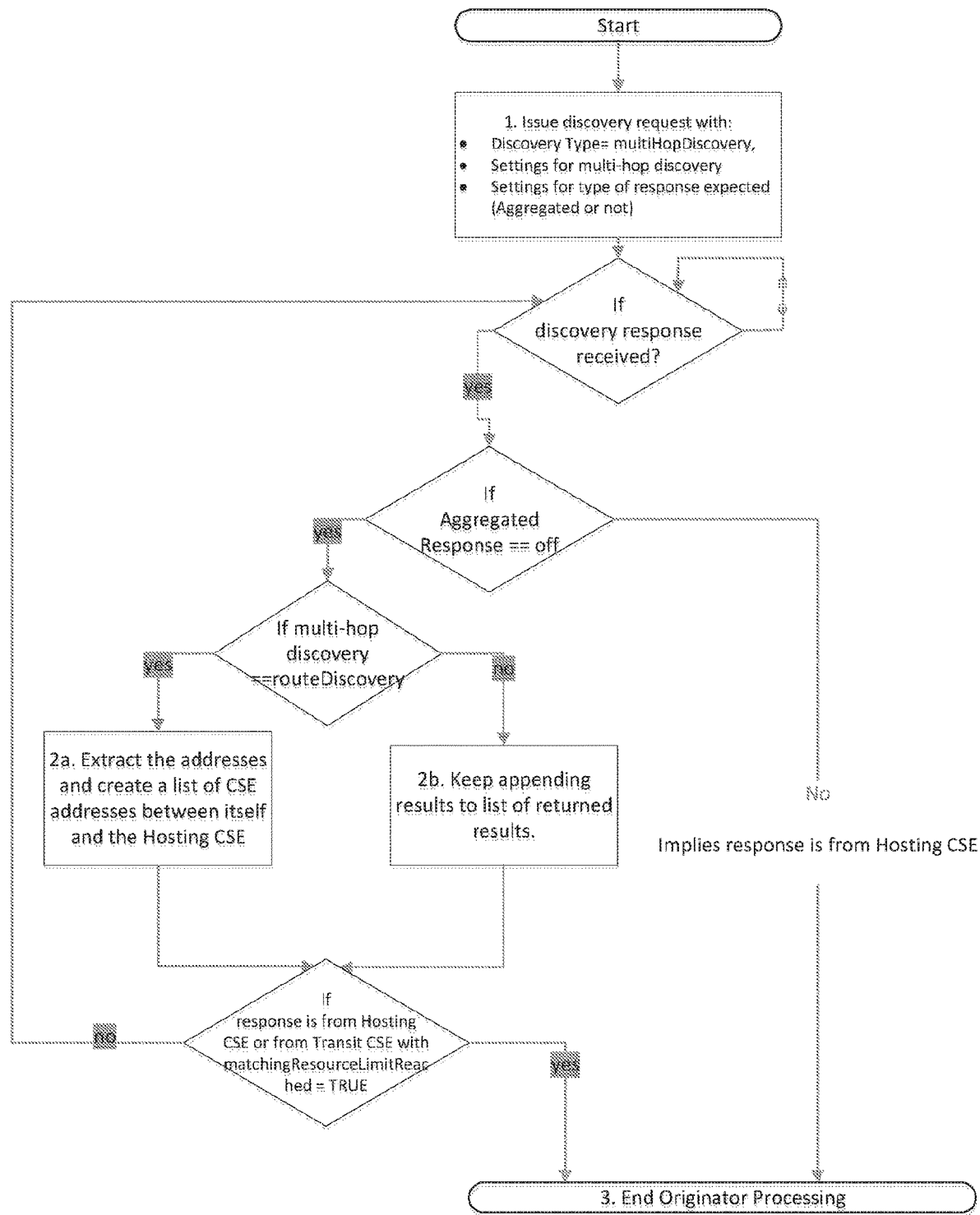
FIG. 8 illustrates a discovery request procedure according to another embodiment.

FIG. 8 illustrates the operations at the originator to handle a multi-hop discovery request. Each step is denoted by a Roman numeral, e.g., 1, 2, etc. In step 1, the originator issues a discovery request. In an exemplary embodiment, this request is sent through a RETRIEVE method. However, it may be sent through a dedicated method or through an UPDATE, CREATE or other similar method. The request may include the following parameters:

To: hosting CSE address of the root of where the discovery begins on Hosting CSE.

Filter Criteria: filter criteria for searching and expected returned result.

Discovery Result Type: optional format of discovery results returned.

discoveryType: multi-hop discovery which asks Transit CSEs to process the discovery request.

MultiHop Discovery SubType: informs the transit CSEs and the hosting CSE about the intention of the originator.

routeDiscovery: signals that the originator would like to find the service layer routing path to the hosting CSE. The service layer routing path is a special routing path following the registration chain between the originator and the hosting CSE and shows the service layer hops followed by a request as it traverses the transit CSEs. For example, an originator is registered to CSE1, CSE1 is registered to CSE2, and CSE2 is registered to the IN-CSE. The service layer routing path is Originator→CSE1→CSE2→IN-CSE. The Transit CSEs are not required to search for resources matching the filter criteria, but rather return a Response so that Originator can maintain a service layer routing path between itself and the specified Hosting CSE.

findUptoKResourcesDiscovery: signals that the originator would like up to 'K' resources matching the filter criteria and that the transit CSEs should stop forwarding the discovery request if 'K' resources have been found.

findUptoNHopsResourcesDiscovery: signals that the originator would like to find resources matching the filter criteria within N service layer hops of the Originator. The CSE processing the Nth hop, should stop forwarding the discovery request.

findAllResourcesDiscovery: signals that the originator would like all resources matching the filter criteria in the hosting CSE and in any transit CSE between the originator and the hosting CSE.

Aggregated Response: set to on/off. If on, informs the transit CSEs to aggregate the discovery results before sending the response towards the originator. If off, informs the transit CSEs to send discovery results towards the originator if they find resources matching the filter criteria.

matchingResourceLimit parameter (may be included in the filter criteria) specifies the number of matching resources the originator is looking for (the value of 'K' as described above).

hopLimit parameter (may be included in the filter criteria) specifies the maximum number of service layer hops for the discovery request (the value of N as described above).

According to step 2 in FIG. 8, the originator waits for the discovery response messages. If the discoveryType was set to multiHopDiscovery and Aggregated Response was set to off, the originator may receive multiple response messages (from the transit CSEs and from the hosting CSE). The Originator uses the request identifier to cross-reference the responses with the initial discovery request. In step 2a, if MultiHop Discovery SubType is set to routeDiscovery, the originator extracts the addresses (or IDs at the service layer) and creates a list of CSE addresses between itself and the hosting CSE. However, as shown in step 2b, if MultiHop Discovery SubType is not routeDiscovery, the originator keeps an updated list of all returned results.

Next in step 3, the originator may terminate the discovery procedure upon: (i) receiving a response from the Hosting CSE; or (ii) receiving a response from a transit CSE with a parameter matchingResourceLimitReached=TRUE. This signals to the originator that the desired number of resources matching the filter criteria have been found and that the discovery request has stopped being forwarded; (iii) receiving a response from a CSE with a parameter hopLimitReached=TRUE. These signals to the Originator that the desired number of hops have been traversed by the discovery request.

In another embodiment, an originator may optionally keep two separate lists. One for original resources and one for announced resources. It may decide to retrieve the original resource addresses of all (or a select number) of announced resources. If it determines that a resource on the announced resource list is pointing to a resource on the original resource list, it may mark the announced resource as a duplicate or it may decide to delete the announced resource.

Procedure at Transit CSE for Multi-Hop Discovery

Figure 9:
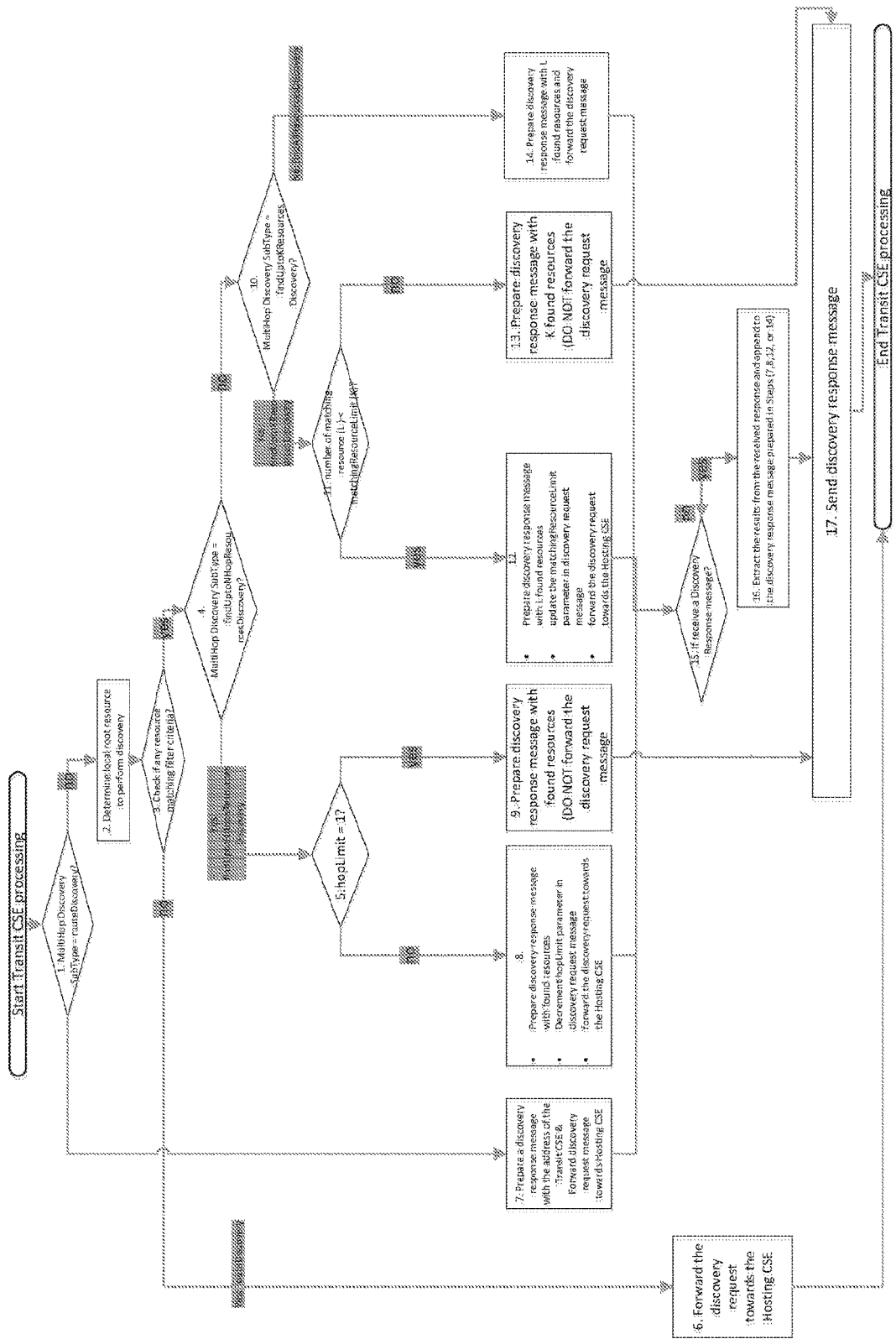
FIG. 9 illustrates discovery procedures at a transit CSE according to an embodiment.

According to yet another embodiment, FIG. 9 illustrates the procedures at a transit CSE for the case with Aggregated Response=On. This means that the discovery request response message at a transit CSE is not immediately sent back to an originator. According to step 1, a check is made whether MultiHop Discovery SubType is routeDiscovery. If so, the transit CSE prepares a discovery response message in step 2 including but not limited to the following parameters: (i) To: ID of the Originator; (ii) From: ID of the Transit CSE; and (iii) Content: CSE Address of the Target CSE. Optionally, the Transit CSE may add other information related to this Transit CSE, e.g., loading condition, access control, etc. The message is subsequently sent to the originator in step 17.

On the other hand, if the query in step 1 is determined to be negative, the transit CSE determines the local root resource at which to begin discovery (step 2). This may be set to the transit CSE root, e.g., /CSEBase. Next, the transit CSE checks if there are any resources that match the filter criteria (step 3). If the response to the query is no, the transit CSE (CSE_A) forwards the request towards the hosting CSE if it is registered with the Hosting CSE; or forwards the Request to another Transit CSE (CSE_B) that the Transit CSE (CSE_A) is registered with (step 6).

On the other hand, if the response to the query is yes, the transit CSE determines how many results to return (step 4). Here, the transit CSE checks if Multihop Discovery Sub-Type equals findUptoNHopResourcesDiscovery. If so, the transit CSE checks if it is the last CSE based on hop count (hopLimit in the discovery request==1) (step 5). If the check is false, the transit CSE prepares a response message with the following parameters (step 8): (i) To: ID of the originator (ii) From: ID of the Transit CSE; (iii) Content: List of found resources; and (iv) hopLimitReached=FALSE. The transit CSE modifies the discovery request message by decrementing the hopLimit by 1. The transit CSE then forwards the discovery request message towards the Hosting CSE. Thereafter, it proceeds with Step 15 where it waits for a discovery response message to aggregate.

If the answer to the query in step 5 is yes, the transit CSE prepares a response message with the following parameters (step 9): (i) To: ID of the Originator; (ii) From: ID of the Transit CSE; (iii) Content: List of found resources; and (iv) hopLimitReached=TRUE. Here, the transit CSE does not forward the discovery request message. The transit CSE proceeds to step 17 where it send a discovery request response message to the originator.

On the other hand, if the response to the query in step 4 is no, the transit CSE checks if MultiHop Discovery Sub-Type is findUptoKResourcesDiscovery or =findAllResourcesDiscovery (step 10). If it is the former the transit CSE has a list of L matching resources and matchingResourceLimit specified in the discovery request is 'K'. Transit CSE checks if L<K (step 11). If L<K (step 12), the transit CSE prepares a response message with the following parameters: (i) To: ID of the Originator; (ii) From: ID of the Transit CSE; (iii) Content: List of L found resources; (iv) matchingResourceLimitReached=FALSE. Then, the transit CSE modifies the discovery request message by decrementing the matchingResourceLimit by the number of found resources
(matchingResourceLimit=matchingResourceLimit−L).
Transit CSE forwards the discovery request message towards the hosting CSE. Then the CSE waits for a discovery response message to aggregate (step 15).

Otherwise, if the answer to the query in step 11 is no, the transit CSE prepares a response message with the following parameters (step 13): (i) To: ID of the Originator; (ii) From: ID of the Transit CSE; (iii) Content: List of K found resources; and (iv) matchingResourceLimitReached=TRUE. The transit CSE does not forward the discovery request message, it may proceed with sending a discovery response message to the originator (step 17).

If the answer to the query to step 10 is findAllResources-Discovery go to Step 14. Here, the transit CSE prepares a response message with the following parameters: (i) To: ID of the Originator; (ii) From: ID of the Transit CSE; (iii) Content: List of found resources; and (iv) matchingResourceLimitReached=FALSE. Transit CSE continues to forward the discovery request message towards the Hosting CSE. Then the transit CSE may wait for a discovery response message in Step 15. Upon reception of a discovery response Transit CSE uses the request ID to cross-reference the response to the request (step 16). It then extracts the results from the received response and aggregates this information to discovery response prepared in Step (7, 8, 12, or 14) Finally, the transit CSE ends its processing (step 18).

Procedure at Hosting CSE for Multi-Hop Discovery

Figure 10:
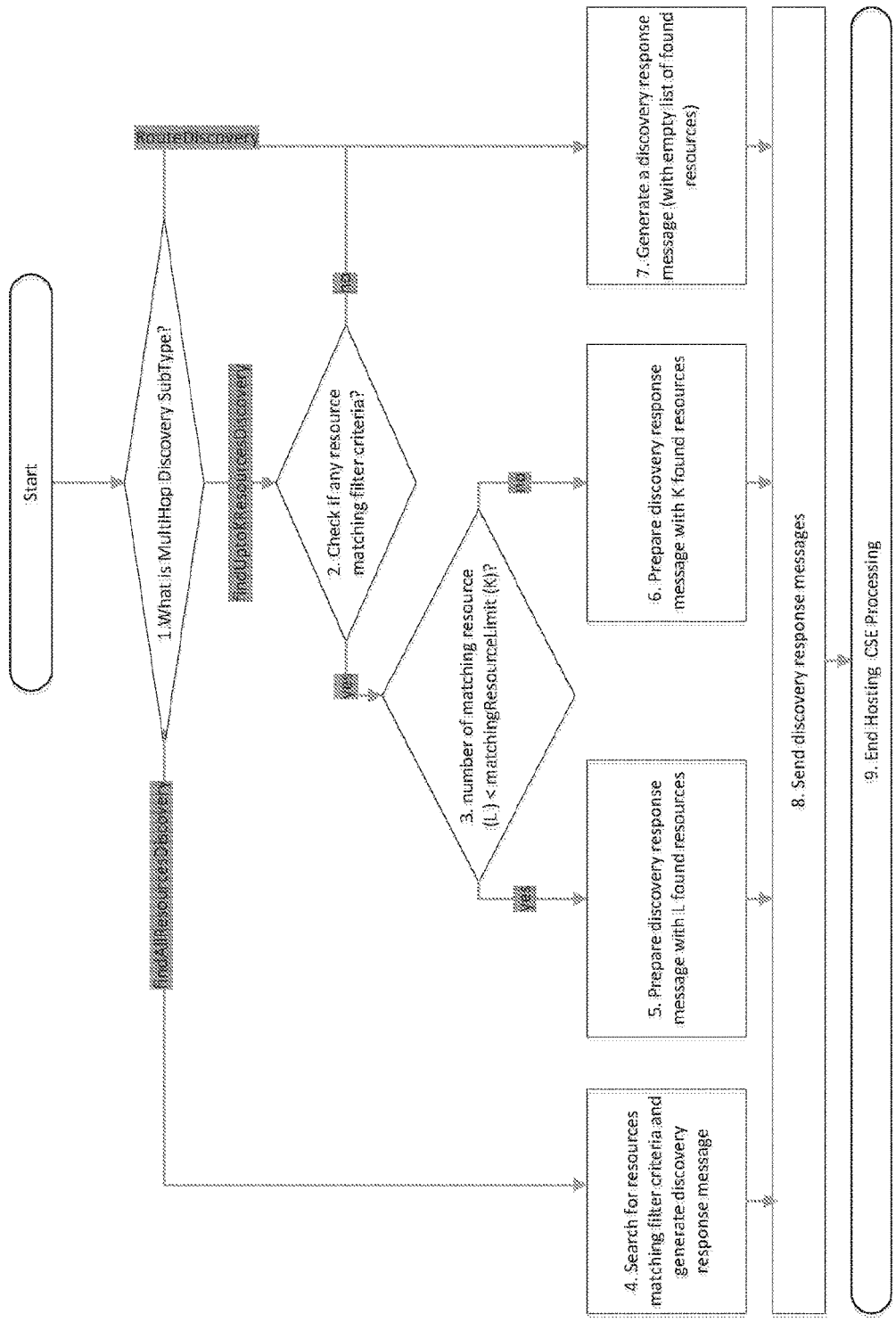
FIG. 10 illustrates multi-hop discovery procedures according to another embodiment.

According to another embodiment as illustrated in FIG. 10, the operations at a Hosting CSE upon reception of a discovery request are described. In step 1, the Hosting CSE checks what is the MultiHop Discovery SubType. If it is RouteDiscovery, then it goes to step 7 which generates a Discovery response message (with address of Hosting CSE) with parameters. The message includes: To: ID of the Originator; From: ID of the Hosting CSE; and Content: CSE Address of the Hosting CSE. Optionally, the Hosting CSE may add other information related to this Hosting CSE, e.g., loading condition, access control, etc. Next, the discovery response message is sent (step 8). Thereafter, the CSE ends its processing (step 9).

On the other hand, from step 1, if the discovery subtype is findAllResourcesDiscovery, it proceeds to step 4. In step 4, the Hosting CSE generates a discovery response message with parameters: To: ID of the Originator; From: ID of the Hosting CSE; and Content: Address of all resources matching the filter criteria. Then the process proceeds with step 8 as discussed above.

Alternatively, from step 1, if the discovery subtype is findUptoKResourcesDiscovery, the process moves to step 2 where the Hosting CSE checks if there are any resources that match the filter criteria. If not, it goes to step 7 as described above. If yes, it determines how many results to return (step 3). Specifically Hosting CSE has a list of L matching resources and matchingResourceLimit specified in the discovery request. If L<K, the process proceeds to step 5. In step 5, the Hosting CSE prepares a Response message with the following parameters: To: ID of the Originator; From: ID of the Hosting CSE; Content: List of L found resources matchingResourceLimitReached=TRUE. From step 5, the process goes to step 8, as described above, and then on to step 9, as described above.

Alternatively, if the answer from step 3 is no, the process goes to step 6. In step 6, the Hosting CSE prepares a response message with the following parameters: To: ID of the Originator; From: ID of the Hosting CSE; Content: List of K found resources; matchingResourceLimitReached=TRUE. Then it proceeds with step 8.

The multi-hop discovery procedure may have alternatives. The originator may specifically list the transit CSEs that need to perform the multi-hop processing. If a transit CSE is not on this list, it may revert back to forwarding the discovery request towards the hosting CSE.

Multi-Hop Discovery Call Flow

Figure 11:
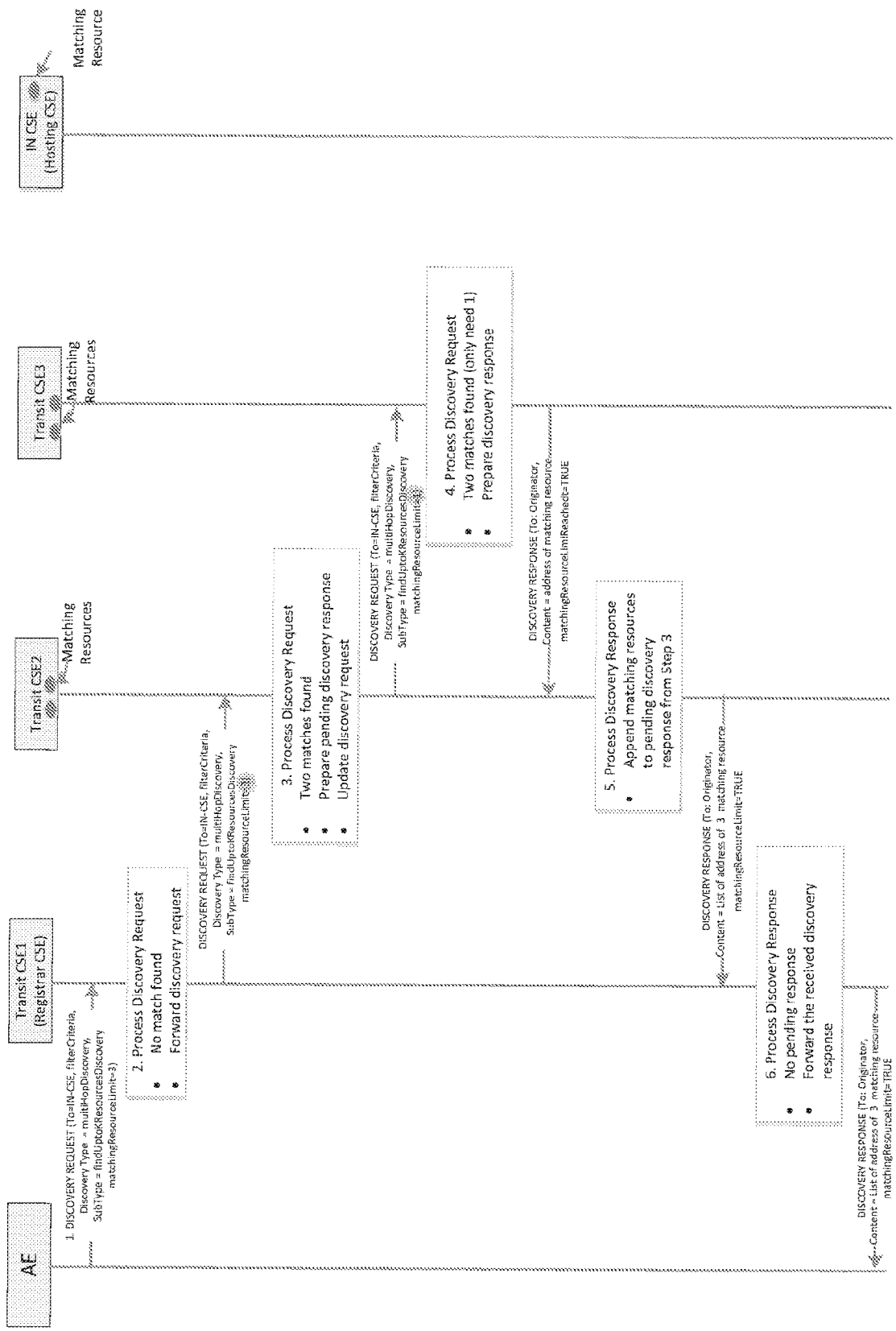
FIG. 11 illustrates discovery request procedures according to another embodiment.

According to another embodiment as shown in FIG. 11, there is described processing at, and the signaling between, each of the entities. The call flow assumes that the originator is looking for the first 3 resources matching specified filter criteria. Resources matching this criteria are located in transit CSE 2 (2×), in transit CSE 3 (2×), and in the IN-CSE (1x). Although not shown, it is assumed that the originator has requested an aggregated response (Aggregated Response=On).

In step 1, the originator issues a discovery request towards the IN-CSE, specifying: Discovery Type=multihopDiscovery; MultiHop Discovery SubType=findUptoKResourcesDiscovery; matchingResourceLimit=3

In this embodiment, in step 2, at the transit CSE1, no matching resources exist, so the discovery request is forwarded towards IN-CSE. At step 3, at transit CSE2, two matching resources exist. The transit CSE updates the discovery request (reducing the matchingResourceLimit to 1 and forwards it towards IN-CSE. Furthermore, the transit CSE2 prepares a pending discovery response (with the address of the two matching resources) and then waits for a discovery response.

In step 4, at the transit CSE3, two matching resources exist, but the request is only looking for 1 more resource. Transit CSE3 prepares a discovery response (with the address of one matching resource) and sends the discovery response towards the originator, specifying one or more of the following: content=address of matching resource; and matchingResourceLimitReached=TRUE. Note that the discovery request is not forwarded towards the IN-CSE.

In step 5, at the transit CSE2, the results from the received discovery response are appended to the pending discovery response (from Step 3) and the pending discovery response is sent towards the Originator. The details include but are not limited to: content=List of addresses of matching resource (2 from Transit CSE2 and 1 from Transit CSE3); and matchingResourceLimitReached=TRUE. At step 6, at transit CSE1, there is no pending discovery response, so the received discovery response is forwarded towards the originator.

Conditional Discovery

According to another aspect of the application, the originator may issue a discovery request towards a hosting CSE. However it may only need to be performed if a condition on another resource is met. The condition is checked at a CSE referred to as the "Conditional CSE". Although the description below applies to a single condition, the processing can be generalized to include any number of conditions. The processing at each of the impacted entities is described below.

In one embodiment, as a pre-requisite, the originator knows the address of the resource where the condition is to be checked. This may have been obtained by a prior discovery procedure. According to step 1, the originator issues a discovery request. This may be sent through a dedicated method or through a RETRIEVE, UPDATE, CREATE or other similar method. The request may include one or more of the following parameters: (i) To: Address of the root of where the discovery begins on Hosting CSE; (ii) Filter Criteria: Filter criteria for searching and expected returned result; (iii) Discovery Result Type: optional, format of discovery results returned; (iv) Discovery Type=conditionalDiscovery which asks Transit CSEs to process the discovery request if they are a Conditional Transit CSE; (v) ConditionedOn: Address of resource on which the condition should be checked; (vi) ConditionCriteria: The criteria for the resource on which the condition is to be checked. The criteria may be based on memory size, resource type, battery status, etc.; and (vii) ConditionPersistence: How long the Conditional Transit CSE should wait before giving up on the condition. A value of 0 indicates that the check should be done only upon reception of the discovery request. A value of non-zero indicates that the Conditional Transit CSE is allowed to wait until the condition is met, before forwarding the discovery request. The CSE is allowed to wait for ConditionPersistence time, or until the discovery request expires.

According to step 2, where the originator waits for the discovery response message. The originator may terminate the discovery procedure upon receiving a response from the Conditional Transit CSE with ConditionalDiscoveryStatus=FAIL. This signals to the originator that the condition has not been met and that there are no resources matching the conditional discovery. It may also terminate the discovery request if receiving a response from the Hosting CSE. This signals to the originator that the condition was met at conditional transit CSE, and the returned results match the filter criteria at the hosting CSE.

Figure 12:
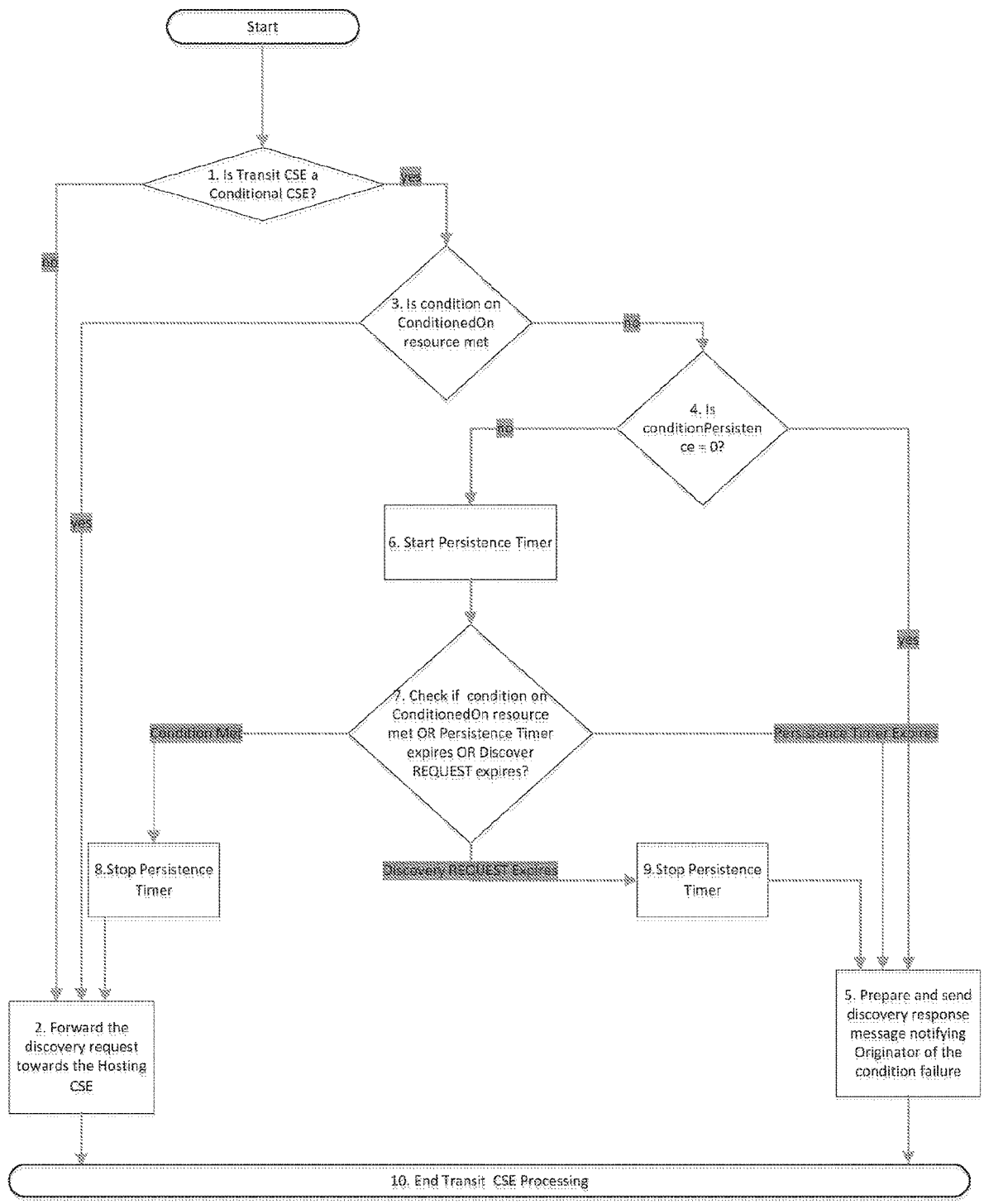
FIG. 12 illustrates discovery procedures at a transit CSE according to another embodiment.

FIG. 12 illustrates the operations at a Transit CSE upon reception of a discovery request. In step 1, the CSE checks whether the Transit CSE is a Conditional CSE (the Transit CSE corresponds to the CSE in the ConditonedOn parameter of the discovery request). If yes, the process will go to Step 3. Otherwise, the process goes to step 2 to continue forwarding the request towards the Hosting CSE. According to step 2, the transit CSE (CSE_A) forwards the request to the hosting CSE if it is registered with the hosting CSE, or alternatively forwards the request to another transit CSE (CSE_B) that the transit CSE (CSE_A) is registered with. Then it proceeds to Step 10.

Next, in step 3, the process checks whether the ConditionCriteria is met for the resource pointed to by the ConditonedOn parameter of the discovery request (step 3). If yes, it moves to step 2. Otherwise the process moves to step 4. In step 4: Check whether the ConditionPersistence is zero. If yes, move to step 5 to prepare a discovery response message with parameters: (i) To: ID of the Originator; (ii) From: ID of the Transit CSE; and (iii) Content: empty ConditionalDiscoveryStatus=FAIL. Then the process goes to Step 10 where the transit CSE processing ends.

From step 4, if the answer is no, it moves to Step 6 to start the Persistence Timer. This timer represents how long the Transit CSE should wait before giving up on the requested condition. Alternatively, the Transit CSE may also forward the discovery request towards the Hosting CSE, but with parameter ConditionalDiscoveryStatus=FAIL. This is not shown in the figure.

Step 7 proceeds from step 6. Here a check is made whether a condition is met during the ConditionPersistence time. If yes, move to step 8. Here, the persistence timer is stopped. Then, proceed to step 2 to forward the discovery request toward the hosting CSE. Alternatively, if the persistence timer started in step 6 expires, move to Step 5. Alternatively, if the discovery request expires move to Step 9.

Alternatively, from step 7, if the Discovery request expires, stop the Persistence Timer (step 9) and then move to step 5. Further the processing ends in step 10.

In an embodiment, if the transit CSE is a conditional CSE it may include an indication that the condition was successful in the discovery request forwarded to the hosting CSE (not shown). The conditional CSE may also send a discovery response to the originator when the condition is met (not shown). The originator may use this as an indication that a discovery response from its initial query is on the way.

Procedure at Hosting CSE for Conditional Discovery

The procedure at the hosting CSE is as described below. This procedure assumes that the conditional transit CSE forwards the discovery request only if the condition is met.

In such a case, the discovery request received at the hosting CSE may have parameter ConditionalDiscoveryStatus=PASS. According to step 1, the hosting CSE searches for resources that match the filter criteria. It prepares a discovery response based on the search results, and proceeds to Step 2. Here, the hosting CSE sends the discovery response message. Go to Step 5 which ends the process.

Alternatively, if it is assumed that a hosting CSE may receive a discovery request with parameter ConditionalDiscoveryStatus=FAIL, the procedure at the hosting CSE is as described below. This implies that the conditional Transit CSE forwards the discovery request towards the hosting CSE, even if the condition is not met. This may occur in cases where: (i) the hosting CSE wants an indication of how many discovery attempts were made on a resource, or (ii) the transit CSE are not permitted to respond to discovery requests with a discovery response. In step 1, the hosting CSE checks if the discovery request is of type ConditionalDiscovery. If not, it proceeds to Step 2, In step 2: The Hosting CSE searches for resources that match the filter criteria. It prepares a discovery response based on the search results, and proceeds to Step 4.

Otherwise the process proceeds to step 3 where the hosting CSE checks the ConditionalDiscoveryStatus. If PASS, then Proceed to Step 2. If FAIL, prepare a discovery response message with parameters: (i) To: ID of the Originator; (ii) From: ID of the Hosting CSE (iii) Content: empty. Thereafter, the hosting CSE sends the discovery response message (step 4). Then go to Step 5 which ends processing at Hosting CSE.

Conditional Discovery Call Flow

Figure 13:
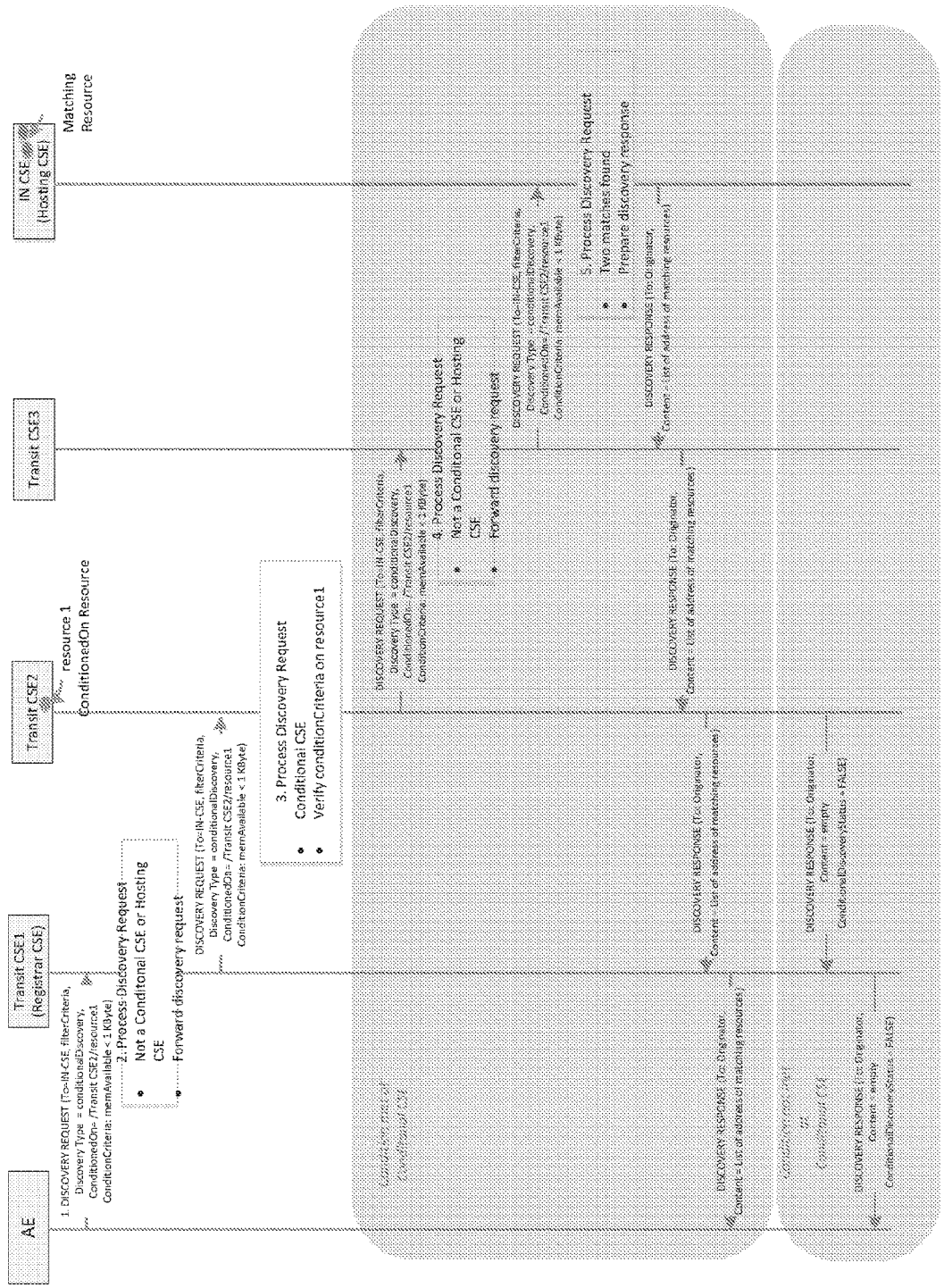
FIG. 13 illustrates conditional discovery procedures according to an embodiment.

According to another embodiment, for example as shown in FIG. 13, shows an example of the processing at, and the signaling between, each of the entities from one of the above-mentioned embodiments. The call flow assumes that the originator is looking for resources matching a specified filter criteria in IN-CSE (resource size above 1 Kbyte), but only if resource1 (node 1, Transit CSE2) monitoring the available memory at node1, is less than 1 Kbyte (condition1→node1/memory/memAvailable <1 KByte).

According to step 1, the originator issues a discovery request towards the IN-CSE. The request may specify one or more of the following: (i) Discovery Type=conditionalDiscovery; (ii) ConditionOn=/TransitCSE2/resource1; and (iii) ConditionCriteria: memAvailable<1 Kbyte. In step 2, the transit CSE1 is not a Conditional CSE, so the discovery request is forwarded towards IN-CSE. In step 3, transit CSE2 is a Conditional CSE, so the CSE verifies if the ConditionCriteria is met. If the condition is met, the transit CSE2 forwards the discovery request towards the IN-CSE for further processing. If the condition is not met, Transit CSE2 prepares a discovery response to return to the Originator, specifying one or more of the following: (i) To: Originator; (ii) content="empty"; and (iii) ConditionalDiscoveryStatus=FALSE. In step 4, the transit CSE3 is not a Conditional CSE, so the discovery request is forwarded toward IN-CSE. Further, in step 5, if the discovery request reaches Hosting CSE, this implies that the condition was successful. The IN-CSE obtains the list of resources matching the filter criteria, generates a discovery response and sends it towards the Originator. Details: (i) To: Originator; (ii) content=List of addresses of matching resource; and (iii) optionally, ConditionalDiscoveryStatus=TRUE Discovery with Hosting CSE Redirect In yet a further aspect of the application, the originator may issue a discovery request towards a hosting CSE. It may, at the same time, query the transit CSEs whether they know of alternate hosting CSEs that have resources that match the filter criteria. The processing at each of the impacted entities is described below. The first protocol is at an originator for hosting CSE redirect.

In step 1, the originator issues a discovery request. This may be sent through a dedicated method or through a RETRIEVE, UPDATE, CREATE or other similar method. The request may include the following parameters: (i) To: Address of the root of where the discovery begins on Hosting CSE; (ii) Filter Criteria: Filter criteria for searching and expected returned result; (iii) Discovery Result Type: optional, format of discovery results returned; (iv) Discovery Type=hostingCSERedirect which informs Transit CSEs to assess if they know alternate hosting CSEs that have resources that match the filter criteria. For example, the target CSE may look through all the announced resources it is hosting to see if there is a match to the discovery search criteria. Alternatively, if the transit CSE keeps a cache of all prior discovery responses that it has processed/forwarded, it may look through this cache to determine if there are any resources matching the filter criteria.

Yet another parameter may include a RequestedAction. This may be an action to be performed at the transit CSEs if they know of alternate hosting CSEs. Possible options include a notifyOriginator notify the Originator that an alternate hosting CSE exists. The final decision to send a new discovery request to the alternate hosting CSE is left to the originator. This may also include the action of takeAutonomousAction. This allows the transit CSE to autonomously change the hosting CSE (for services or applications not requiring much privacy or security)

According to step 2, the originator waits for the discovery response message. The originator may terminate the discovery procedure upon one or more of the following actions. One action may include receiving a response from a transit CSE with a list of potential hosting CSEs and optionally the metrics for these potential hosting CSEs. The originator can then decide on the best hosting CSE (based on the supplied metrics) and issue a new discovery request. Another action may include receiving a response from a hosting CSE. If this is the same hosting CSE as in the discovery request, no hosting CSE redirect has occurred. If this is not the same hosting CSE as in the discovery request, this signals to the originator that a transit CSE has autonomously changed the hosting CSE. Alternatively, the discovery response may contain a discoveryRedirect parameter. If this parameter is set to TRUE, it signals to the Originator that the Hosting CSE has been redirected.

Figure 14:
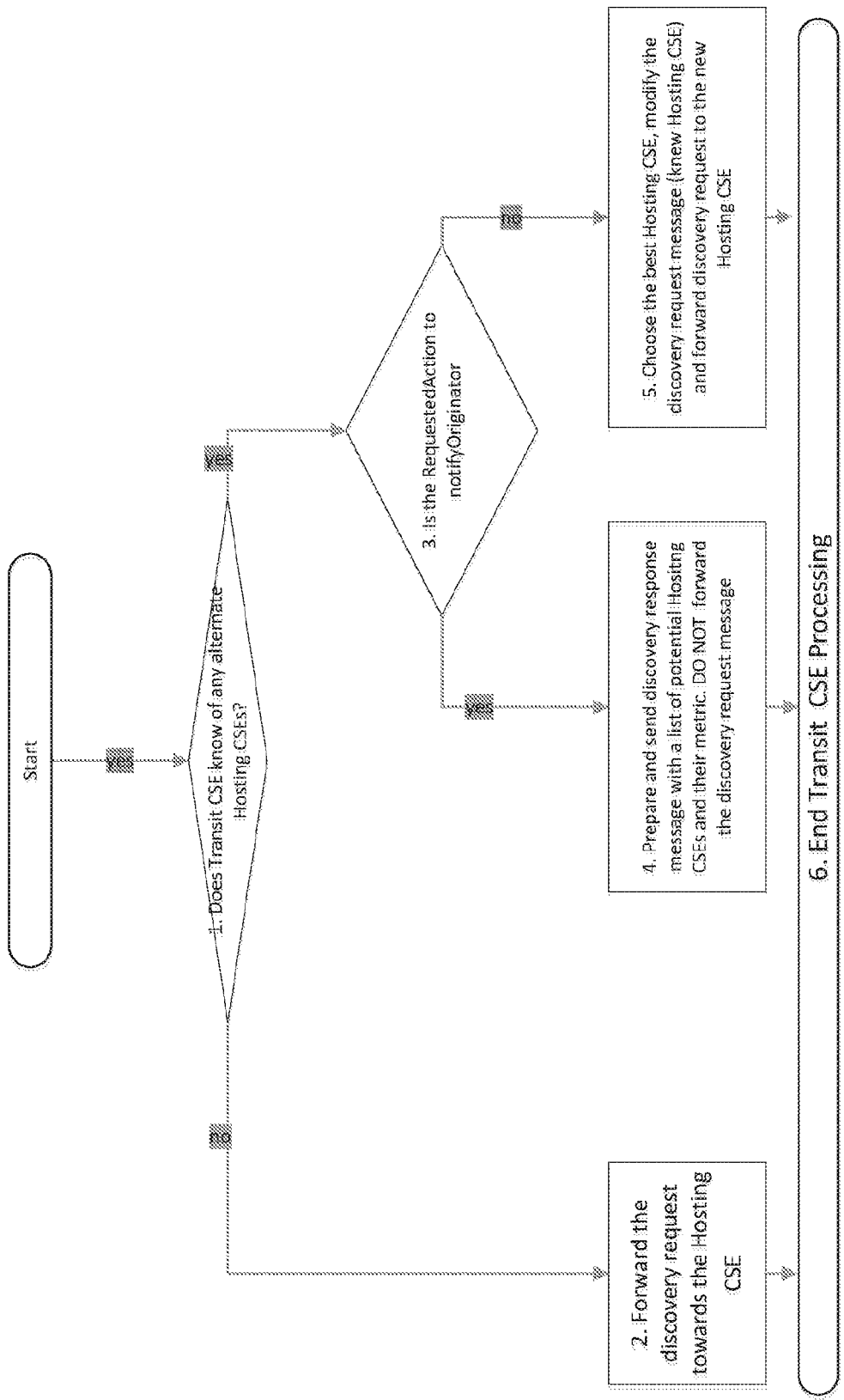
FIG. 14 illustrates redirect discovery procedures according to an embodiment.

In another embodiment, there is a procedure at a transit CSE for hosting CSE redirect. FIG. 14, for example, illustrates the operations at a transit CSE upon reception of a discovery request. According to step 1, a check is performed whether the transit CSE knows of any alternate hosting CSE that have resources that match the filter criteria. For instance, this may be achieved through announcements to the transit CSE. If yes, the process proceeds to step 3. In step 3 a query is performed whether the RequestedAction is notifyOriginator. If yes, it may proceed to step 4 to prepare a discovery response message with one or more parameters of (i) To: ID of the Originator; (ii) From: ID of the Transit CSE; and (iii) Content: address of potential hosting CSEs and optionally metrics associated to these CSEs. Some metrics may include: service layer parameters, e.g., traffic load, service layer hops, underlying network parameters, e.g., number of hops, type of underlying access network, and information about the maintained resources, e.g., type, some basic semantics, etc. Further, the transit CSE does not forward the discovery request. Then the process proceeds to step 6.

Alternatively, if the query is no from step 3, it proceeds to step 5. In step 5, it chooses a best hosting CSE. This may be based on lowest hop count to the hosting CSE, underlying network connectivity to the hosting CSE, etc. If the chosen hosting CSE is different from that included in the discovery request message, then it modifies the discovery request message by changing the "To" parameter to match the chosen hosting CSE. It includes an indication that this is a redirected discovery request—(set discoveryRedirect=TRUE). Then it forwards the discovery request towards the chosen hosting CSE. Then the process proceeds to Step 6. Alternatively, the target CSE may fan out the discovery request to all alternate hosting CSEs (or a subset of these based on some metric (e.g. lower hop count)). Further, the process ends (step 6).

Even further, if the query from step 1 is no, it proceeds with step 2 in order to forward the request towards the hosting CSE. According to step 2, the transit CSE (CSE_A) forwards the request to the hosting CSE if it is registered with the hosting CSE. Alternatively it may forward the request to another transit CSE (CSE_B) that the Transit CSE (CSE_A) is registered with. Then the process may proceed to Step 6.

In yet even another embodiment, the procedure may be at a hosting CSE for hosting CSE redirect. According to step 1, the hosting CSE searches for resources that match the filter criteria. It prepares a discovery response based on the search results, and proceeds to step 2. In step 2, the hosting CSE prepares the discovery response message. It may include the following parameters: (i) To: ID of the Originator; (ii) From: ID of the Hosting CSE; (iii) Content: list of resources that match the filter criteria; and (iv) discoveryRedirect: set to the value of discoveryRedirect parameter in the discover request message. If set to TRUE, indicates to the Originator that this is not the Hosting CSE included in the discover request message.

Figure 15:
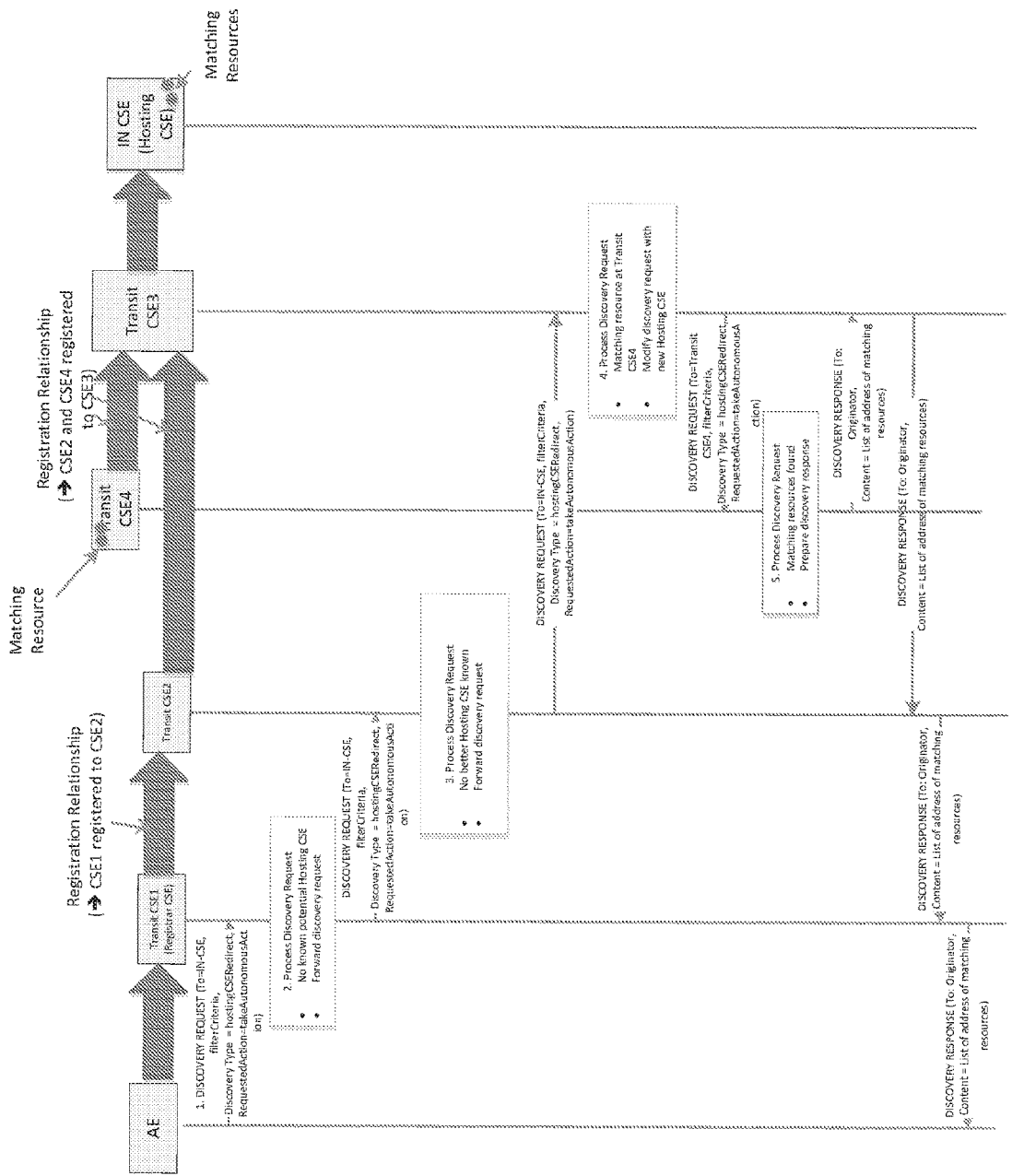
FIG. 15 illustrates discovery protocols according even another embodiment.

According to another embodiment, a hosting CSE redirect call flow will be described. As shown in FIG. 15, the call flow shows an example of the processing at, and the signaling between, each of the entities from one or more embodiments. The bold arrows between the entities denote the registration relationship. The transit CSE2 and transit CSE4 are both registered to transit CSE3. However transit CSE4 is not on the registration path from the Originator to the IN-CSE. To reflect this, the Transit CSE4 is shown in red. The call flow assumes that the originator is looking for resources matching a specified filter criterion. The originator targets the resource discovery in IN-CSE, but permits the target CSEs to autonomously change the hosting CSE if they know of matching resources in other CSEs. In the example presented, transit CSE3 is aware of matching resources in transit CSE4 (for example as a result of the remoteCSE created in Transit CSE3 during the registration procedure).

According to step 1, the originator issues a discovery request towards the IN-CSE, specifying one or more of the following: (i) To: IN-CSE; (ii) Discovery Type=hostingCSERedirect; and (iii) RequestedAction=takeAutonomousAction. In step 2, the transit CSE1 does not know of any other potential hosting CSEs, so the discovery request is forwarded towards IN-CSE. In step 3, the transit CSE2 does not know of any other potential hosting CSEs, so the discovery request is forwarded towards IN-CSE. In step 4: transit CSE3 knows that resources matching the filter criteria may be found at transit CSE4. It decides to autonomously change the hosting CSE of the discovery request. It modifies the discovery request, and forwards the request towards transit CSE4 for further processing. The modified discovery request: (i) To: Transit CSE4; (ii) Discovery Type=hostingCSERedirect; and (iii) RequestedAction=takeAutonmousAction.

In step 5 the transit CSE4, obtains the list of resources matching the filter criteria, generates a discovery response and sends it towards the Originator. The details include but is not limited to: (i) To: Originator; and (ii) content=List of addresses of matching resource.

EMBODIMENTS

A new attribute is proposed for existing oneM2M <CSEBase> resource as listed in Table 4.

TABLE 4

| Attributes of <CSEBase> | Multiplicity | RW/RO/WO | Description |
|---|---|---|---|
| discoveryType | 1(L) | RO | This attribute indicates a list of enhanced discovery procedures supported by the CSE. The discovery Type is from the list: multiHopDiscovery, conditionalDiscovery, hostingCSERedirect, or a combination of 2 or more these. For example: conditionalDiscovery + hostingCSERedirect implies that the CSE supports simultaneous Hosting CSE redirection and Conditional Resource discovery. |

Three new supported operations may be authorized by accessControlOperations. These are listed in Table 5.

TABLE 5

| Name | Description |
|---|---|
| DISCOVER_MULTIHOP | Privilege to discover the resource and forward request |
| DISCOVER_CONDITIONAL | Privilege to conditionally discover the resource |
| DISCOVER_REDIRECT | Privilege to Redirect Hosting CSE |

There are new parameters for RETRIEVE Request. These include the following:

Discovery Type: Optional parameter that applies to discovery related requests, and is used to indicate the enhanced discovery procedure requested by the Originator. The following values for Discovery Type are defined:

multiHopDiscovery: Transit CSEs are to follow logic in as described above in the application.

conditionalDiscovery: Transit CSEs are to follow logic as described above in the application.

hostingCSERedirect: Transit CSEs are to follow logic as described above in the application.

forwarding: Transit CSEs only forward the discovery request.

The originator may specify multiple Discovery Types in its request, e.g., multiHopDiscovery+conditionalDiscovery. Alternatively if DiscoveryType is not present then transit CSE should not process the request, and simply forward the request as described in above, e.g., rollback to the current discovery MultiHop Discovery SubType: Optional parameter applies to discovery related requests when the Discovery Type=multiHopDiscovery. Used to indicate the purpose of the Multi-Hop discovery and the logic required at the Transit CSEs. The following values for MultiHop Discovery Type are defined:

routeDiscovery: signals that the originator would like to find the service layer routing path to the hosting CSE.

findUptoKResourcesDiscovery: signals that the originator would like up to K resources matching the filter criteria.

findUptoNHopResourcesDiscovery: signals that the originator would like to discover resources matching the filter criteria within K service layer hops from the originator.

findAllResourcesDiscovery: signals that the originator would like all resources matching the filter criteria.

RequestedAction: Optional parameter that applies to discovery related requests when the Discovery Type=hostingCSERedirect. Used to indicate if a Transit CSE can autonomously redirect a discovery request or whether this is to be done by the Originator. The following values for RequestedAction are defined:

notifyOriginator. The final decision to send a new discovery request to the alternate Hosting CSE is left to the Originator.

takeAutonomousAction: allow the transit CSE to autonomously change the hosting CSE.

ConditionedOn: Optional resource address to be included when Discovery Type=conditionalDiscovery. This denotes the resource where the condition is to be verified.

ConditionCriteria: Optional criteria to be included when Discovery Type=conditionalDiscovery. This denotes the criteria to be tested on the ConditionedOn resource.

ConditionPersistence: Optional timer value to be included when Discovery Type=conditionalDiscovery. This denotes how long the conditional transit CSE will monitor the condition on the ConditionedOn resource. If 0, the conditional transit CSE will check the condition upon reception on the discovery request. If non-zero, the conditional transit CSE will wait for the condition to be met. It will give up and notify the originator about the condition failure, either after ConditionPersistence time, or after expiry of the discovery request (whichever is first).

In addition the filter criteria parameter has two new conditions specifically for multi-hop discovery as listed in Table 6 below.

TABLE 6

| Condition Tag | Multiplicity | Matching condition |
| --- | --- | --- |
| . | . | . |
| . | . | . |
| . | . | . |
| Limit | 0 . . . 1 | Limitation the number of matching resources to the specified value. |

TABLE 6-continued

| Condition Tag | Multiplicity | Matching condition |
| --- | --- | --- |
| matchingResourceLimit | 0 . . . 1 | Number of matching resources required by the Originator |
| hopLimit | 0 . . . 1 | Number of service layer hops that the discovery request is allowed to traverse |

There are new parameters for RETRIEVE Response. These include the following.

matchingResourceLimitReached: Optional Flag to denote if matchingResourceLimit has been attained.

hopLimitReached: Optional Flag to denote if maximum number of service layer hops have been traversed by the discovery request.

ConditionalDiscoveryStatus: Optional Flag to denote if the condition check at the ConditionedOn resource was met or not.

discoveryRedirect: Optional Flag to denote if a Transit CSE has redirected the associated discovery request to a new Hosting CSE.

Figure 16:
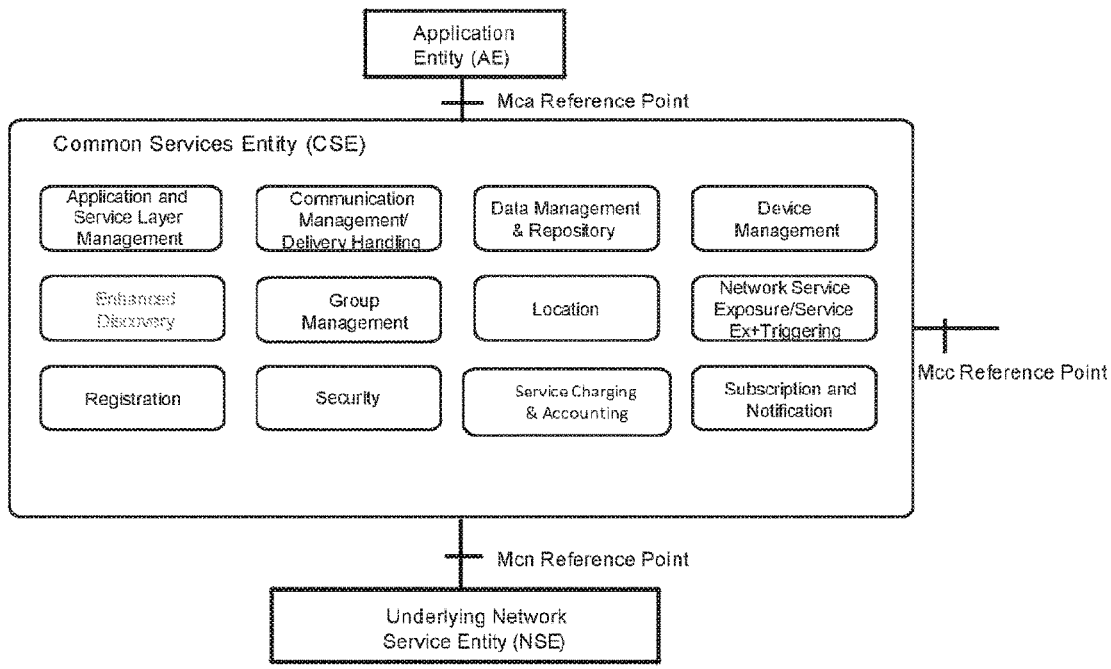
FIG. 16 illustrates enhanced discovery protocols in a common services entity (CSE) according to another embodiment.

FIG. 16 shows an exemplary embodiment for implementing the proposed ideas to existing Discovery CSF to form an Enhanced Discovery CSF based on the current oneM2M functional architecture. The enhanced Discovery CSF can be found in an ASN-CSE, MN-CSE, and IN-CSE. This new enhanced Discovery (eDIS) CSF uses the information in the discovery request (Originator supplied discovery type, filter criteria, destination/target node) to discover resources.

Upon receiving a request, the eDIS CSF determines how to process the request using the supplied discovery type. If discovery type is multi-hop discovery the eDIS CSF takes an action based on the requested multihop discovery subtype—discovering matching resources and forwarding the request to other MN-CSEs or IN-CSEs if more matching resources are required. If discovery type is conditional discovery, and the node hosting this eDIS CSF is the target of a condition, then the eDIS CSF may evaluate the condition, and only forward the request to other MN-CSEs or IN-CSEs, if the condition is met. If the discovery type is Hosting CSE Redirect, the eDIS CSF first determines if it knows any other CSEs that are hosting resources matching the filter criteria, and if so, it may redirect the request to these other CSEs.

Figure 17:
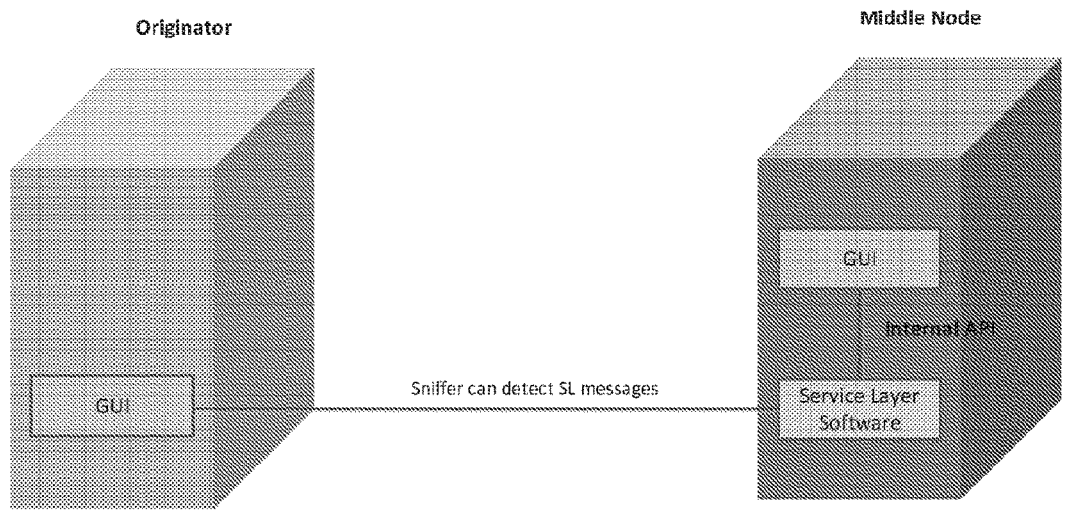
FIG. 17 illustrates a graphical user interface according to another embodiment.

FIG. 17 illustrates how the proposed ideas can be displayed via a GUI interface: (i) on a node behaving as an originator, and (ii) on a middle node running the Service Layer software module. Since there are proposed messages over service layer reference points, the messages can be detected using a sniffer tool between the nodes. A GUI interface can be used to provide configuration to the service layer software, for example, setting some of the parameters/resources proposed in this application. The GUI interface can also be used to display the changes of parameters/resources during the operation. In one embodiment, the GUI on a display may include returned results matching certain search parameters. The search parameters may be based upon resource type, resource creation time, resource size, etc. For instance, 'k' resources matching the filter criteria may be displayed on the GUI. In addition, the number of service layer hops is displayed. According to an exemplary embodiment, the GUI may be displayed as a "Parking-Finder" application. The application may include a user-interface whereby users may enter information such as search parameters. By so doing, the GUI outputs a result indicating the number of free spots available.

The GUI in originator can allow a user to generate a discovery request and send to the Middle node to subsequently display the discovery responses under various discovery types (multiHop Discovery, Conditional Discovery, Hosting CSE Redirection). The GUI in middle node can be used to configure the service layer to create the conditions for the various discovery types (multiHop Discovery, Conditional Discovery, hosting CSE Redirection). For example, a user may use the GUI in originator to generate a discovery request with Conditional Discovery that will evaluate to FALSE. The GUI could display the discovery response.

The processor 32 may be configured to control lighting patterns, images, or colors on the display or indicators 42 in response to whether the learning management system in some of the examples described herein are successful or unsuccessful (e.g., service requests, context retrieval, or context notification, etc.), or otherwise indicate a status of service elements and associated components. The control lighting patterns, images, or colors on the display or indicators 42 may be reflective of the status of any of the method flows or components in the Tables or FIGS. illustrated or discussed herein (e.g., FIGS. 4 and 7-15). Disclosed herein are messages and procedures of service elements. The messages and procedures can be extended to provide interface/API for users to request resource-related resources via an input source (e.g., speaker/microphone 38, keypad 40, or display/touchpad 42) and request, configure, or query service element associated information, among other things that may be displayed on display 42.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 4 and 7-15. The computer executable instructions may be stored in a memory and executed by a processor disclosed above in FIGS. 5C and 5D, and employed in devices including UEs, HSSs and SCSs. In one embodiment, a computer-implemented UE having a non-transitory memory and processor operably coupled thereto, as described above in FIGS. 5C and 5D, is disclosed. Specifically, the non-transitory memory of an originator has instructions stored thereon for performing discovery of CSEs for resources located therein.

The processor is configured to perform the instructions of: (i) generating a Discovery request message (DRM) including a discovery type; (ii) sending the DRM to a CSE; (iii) receiving a discovery response from the CSE.

According to another embodiment, the non-transitory memory of a transit CSE has instructions stored thereon for processing a discovery request for resources. The processor is configured to perform the instructions of: (i) receiving a discovery request from a processor. The request may include a discovery type and filter criteria; (ii) checking whether any resources match filter criteria in the message; and (iii) preparing a discovery response message. In an exemplary embodiment, the processor determines how many results to return based upon the filter criteria.

Real-Life Examples

Figure 18A:
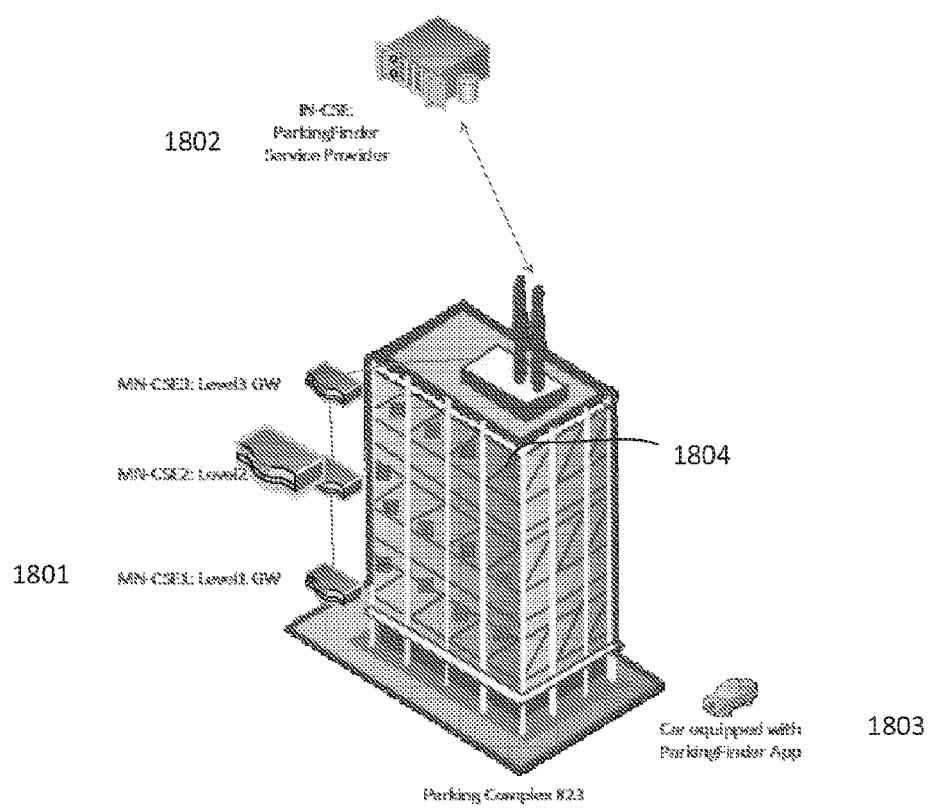
FIGS. 18A and B illustrate examples of the graphical user interface.

The above-mentioned application may be useful in real-life situations. This may include, for example, locating an available parking spot in a parking complex with multiple levels/floors. FIG. 18A illustrates a graphical user interface of available parking spots. Namely, each floor may have one gateway 1801, and each parking spot in the complex is equipped with a sensor 1804 that communicates with its nearest gateway in order to provide an indication as to the status of each spot (free/taken). It may also include details for the parking spot (e.g., if the spot is large enough for a minivan, if it is a wheelchair parking spot, if it close to an elevator, and video feed from the parking spot.). The availability of each parking spot is also shared with a "ParkingFinder" service provider 1802, who has announcements for all parking spots for this building as well as other buildings managed by this service provider.

In this example, a car pulls into the parking complex and the driver is looking for any available parking spot. The car navigation system is equipped with a "Parking Finder" application 1803 that automatically connects to the Wi-Fi network of the parking complex. The "ParkingFinder" application could select one of the announced free spots and retrieve the details from the service provider. Alternatively, the "ParkingFinder" application may ask the "ParkingFinder" service provider to retrieve details about the free spot from the floor/level gateway (for instance: if the spot is large enough for a minivan, it is reserved for wheelchair access, if it close to an elevator, the video feed for this spot, etc.). Separately, a police vehicle may pull into parking complex and check whether anyone is illegally parked in a reserved spot, e.g., wheelchair only.

Figure 18B:
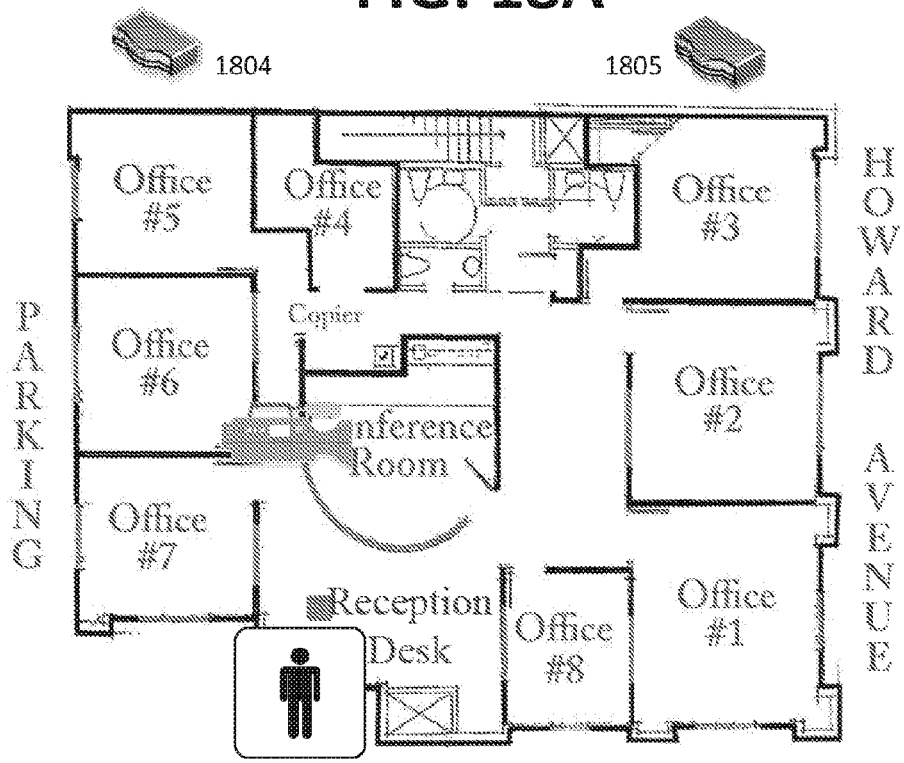

Another example relates to security in a small office shown in the graphical user interface in FIG. 18B. The office entrance is monitored with a video camera that periodically reports its feed to a video gateway 1805 and a MN-CSE sensor gateway 1804. The gateway stores all video feeds over each 24 hour period, and timestamps the recordings so that they can be efficiently retrieved. When the IT department reports a problem (e.g., an unknown user tried to log onto a local machine), the office administrator needs to troubleshoot to determine if this was because of a break-in, or due to some other cause. As a result, the administrator would like to view information regarding the latest reception desk video feed, but only if the front door has been opened. The office administrator application relays information of the video feed if it is triggered by the office administrator (e.g., a reported problem that needs to be troubleshooted).

FIGS. 18A and B illustrates an exemplary display (e.g., graphical user interface) that may be generated based on the methods and systems discussed herein. The display interface (e.g., touch screen display) may provide text associated with service element host selection, such as the parameters of Tables 2-6. In another example, progress of any of the steps discussed herein may be displayed. In addition, graphical output may be displayed on display interface.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An apparatus on a network comprising:
   a non-transitory memory having instructions stored thereon for processing an on-route discovery request message for a resource on the network; and
   a processor, operably coupled to the non-transitory memory, configured to perform the instructions of:
      determining the apparatus is located between an originator and a common service entity in the network;
      receiving the on-route discovery request message targeted for another node from the originator including filter criteria;
      checking whether any resources match the filter criteria in the discovery request message;
      preparing a discovery response message including any of the resources matching the filter criteria; and
      selecting from either forwarding the discovery request message including any of the resources matching the filter criteria to the common service entity or sending the discovery response message including any of the resources matching the filter criteria to the originator,
   wherein the discovery request message includes a discovery type selected from the group consisting of: route discovery, multihop discovery, conditional discovery, hosting common service entity redirect and combinations thereof.

2. The apparatus of claim 1, wherein the processor is further configured to perform the instructions of: determining how many results to return based upon the filter criteria and a discovery type of the discovery request message, and wherein the determining instruction is based upon matching resources less than a matching resource limit 'k'.

3. The apparatus of claim 2, wherein the determining instruction includes:
   checking for other common service entities matching the filter criteria, and
   updating a hosting common service entity based upon the checking instruction.

4. The apparatus of claim 1, wherein the processor is further configured to perform the instructions of:
   receiving a second discovery response message; and
   updating the discovery response based upon results from the second discovery response message.

5. The apparatus of claim 1, wherein the discovery type has a conditional persistence or an alternate common service entity redirect.

6. The apparatus of claim 1, wherein the discovery request message includes at least one of: find up to k resources discovery, find up to N hops resources discovery, find all resources discovery, matching resource limit, and hop limit.

7. A method comprising:
   determining, at a node, being located between an originator and a common service entity in a network;
   receiving an on-route discovery request message targeted for another node from the originator including a discovery type and a filter criteria;
   checking whether a resource matches the filter criteria in the on-route discovery request message;
   preparing a discovery response including the resource if any matches the filter criteria;
   determining, at the node, how many results to return in the discovery response based upon the filter criteria and the discovery type; and
   selecting from either forwarding the discovery request message including the resource if any matches the filter criteria to the common service entity or sending the discovery response message to the originator,
   wherein the discovery request message includes a discovery type selected from the group consisting of route discovery, multihop discovery, conditional discovery, hosting common service entity redirect and combinations thereof.

8. The method of claim 7, wherein the determining step is based upon matching resources 'L' less than a matching resource limit 'k'.

9. The method of claim 7, wherein the determining step includes:
   checking for other common service entities which match the filter criteria; and
   updating a hosting common service entity based upon the checking step.

10. The method of claim 7, further comprising:
    receiving a second discovery response message; and
    updating the discovery response based upon results from the second discovery response message.

* * * * *